(12) United States Patent
Takabatake et al.

(10) Patent No.: US 8,557,112 B2
(45) Date of Patent: Oct. 15, 2013

(54) FINE BUBBLE DIFFUSING PIPE, FINE BUBBLE DIFFUSING APPARATUS, AND SUBMERGED MEMBRANE SEPARATION APPARATUS

(75) Inventors: Hiroo Takabatake, Otsu (JP); Yuji Tanaka, Otsu (JP); Kazuya Sugita, Ehime (JP); Atsushi Kitanaka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 558 days.

(21) Appl. No.: 12/682,197

(22) PCT Filed: Sep. 19, 2008

(86) PCT No.: PCT/JP2008/066942
§ 371 (c)(1),
(2), (4) Date: Apr. 8, 2010

(87) PCT Pub. No.: WO2009/047970
PCT Pub. Date: Apr. 16, 2009

(65) Prior Publication Data
US 2010/0224541 A1    Sep. 9, 2010

(30) Foreign Application Priority Data
Oct. 10, 2007  (JP) .................................. 2007-264095

(51) Int. Cl.
*C02F 3/20*    (2006.01)

(52) U.S. Cl.
USPC ...... 210/205; 210/218; 210/220; 210/321.84; 261/121.1

(58) Field of Classification Search
USPC ............... 210/205, 218, 220, 321.69, 321.84; 261/121.1, 122.1, 122.2, 124, 126
See application file for complete search history.

(56) References Cited

U.S. PATENT DOCUMENTS

2005/0006315 A1*    1/2005    Naess et al. ................... 261/124

FOREIGN PATENT DOCUMENTS

| CA | 2249397 | 3/1997 |
| EP | 0937494 A2 | 8/1999 |
| JP | 57-152998 | 9/1982 |
| JP | 59-150595 | 10/1984 |
| JP | 60-108398 | 7/1985 |
| JP | 02-002865 | 1/1990 |
| JP | 3-19600 | 2/1991 |
| JP | 3-43399 | 4/1991 |
| JP | 07-016591 | 1/1995 |

(Continued)

OTHER PUBLICATIONS

International Search Report dated Dec. 9, 2008, application No. PCT/JP2008/066942.

*Primary Examiner* — Lucas Stelling
(74) *Attorney, Agent, or Firm* — RatnerPrestia

(57) ABSTRACT

A fine bubble diffusing tube that can generate fine bubbles evenly and uniformly even when the diffusing tube has a long length, a fine bubble diffusing device using such a tube and a submerged membrane separation apparatus are produced. The fine bubble diffusing tube is provided with a cylindrical supporting tube 1, and an elastic sheet 2 with fine slits formed therein, with the elastic sheet 2 being placed to cover the outer circumference of the supporting tube 1, so that, upon supplying a gas to a space between the elastic sheet 2 and the supporting tube 1, the fine slits of the elastic sheet 2 are opened to generate fine bubbles, and the supporting tube 1 has a length L of 1000 mm or more in the longitudinal direction, with gas supply units 4 serving as gas flow inlets being attached to the two ends of the supporting tube.

10 Claims, 20 Drawing Sheets

(56) References Cited

FOREIGN PATENT DOCUMENTS

| | | |
|---|---|---|
| JP | 08-323161 | 12/1996 |
| JP | 10244262 | 9/1998 |
| JP | 10-296252 | 11/1998 |
| JP | 11-300177 | 11/1999 |
| JP | 2000-263081 | 9/2000 |
| JP | 2000-517233 | 12/2000 |
| JP | 2001-212587 | 8/2001 |
| JP | 2002-224685 | 8/2002 |
| JP | 2003-245684 | 9/2003 |
| JP | 2003-275546 | 9/2003 |
| JP | 2005-081203 | 3/2005 |
| JP | 2006-263716 | 10/2006 |
| JP | 2007-209948 | 8/2007 |

* cited by examiner

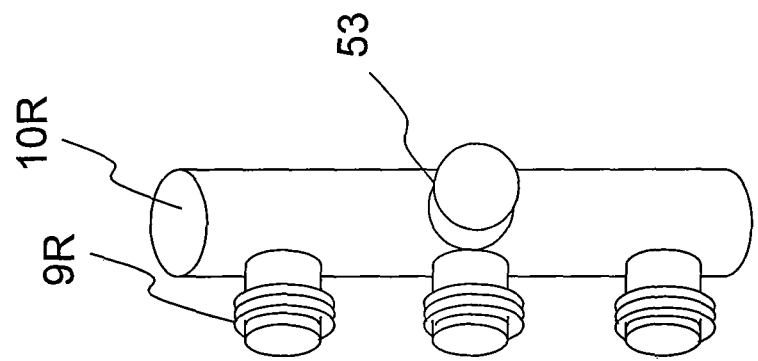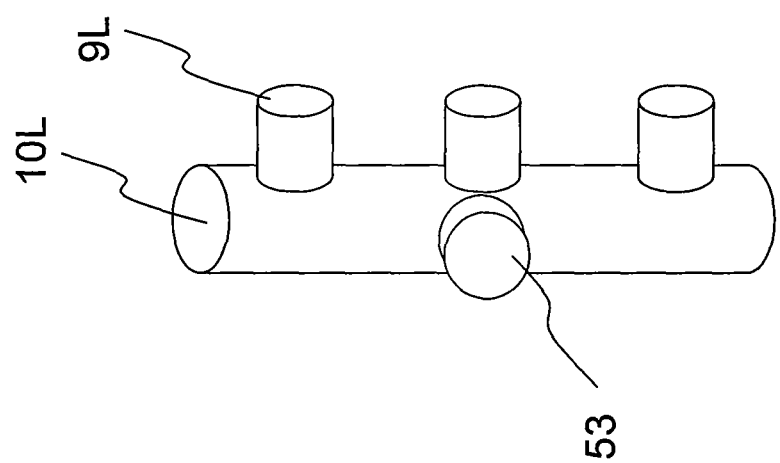
Fig. 12

FINE BUBBLE DIFFUSING PIPE, FINE BUBBLE DIFFUSING APPARATUS, AND SUBMERGED MEMBRANE SEPARATION APPARATUS

This application is a U.S. National Phase Application of PCT International Application No. PCT/JP2008/066942, filed Sep. 19, 2008, which claims priority to Japanese Patent Application No. 2007-264095, filed Oct. 10, 2007, the contents of each of these applications being incorporated by reference herein in their entirety.

FIELD OF THE INVENTION

The present invention relates to a fine bubble diffusing tube that is desirably used for supplying oxygen to active sludge and a microbial culture solution, and a diffusing device using such a tube. The present invention also concerns a submerged membrane separation apparatus that carries out a filtration treatment on polluted water such as sewage, excrement, or industrial wastewater, by using a membrane.

BACKGROUND OF THE INVENTION

In an active sludge method for biologically processing polluted water such as sewage, excrement, or industrial wastewater, and an aerobic valuable product producing process that utilizes microorganisms, it is important to efficiently supply oxygen to the active sludge or the microbial culture solution so as to improve the efficiency of the entire processes, reduce costs and save energy. For example, a fine bubble diffusing tube, as shown in FIG. 18, has been known as such a supply means for oxygen.

In this fine bubble diffusing tube, an elastic sheet 2 with fine slits formed therein is disposed so as to cover the outer circumference of a cylindrical supporting tube 1, and each of the ends thereof is sealed with a tightening metal member 3. The gap between the supporting tube 1 and the elastic sheet 2 on one of the ends of the supporting tube 1 is allowed to communicate with a gas supply unit 4 through a through hole 5. That is, air, supplied from the gas supply unit 4, is allowed to pass through the through hole 5, and then enters the gap between the supporting tube 1 and the elastic sheet 2 so that the elastic sheet 2 is expanded. The expanded elastic sheet 2 causes the fine slits to open, and the supplied gas forms fine bubbles, and the fine bubbles are discharged into activated sludge or a microbial culture solution. Upon stoppage of the air supply, the elastic sheet 2 is contracted to cause the fine slits to close so that, when no fine bubbles are discharged, the activated sludge or the microbial culture solution is prevented from flowing into the diffusing tube through the fine slits, thereby making it possible to prevent clogging of the fine slits and stain inside the diffusing tube.

Moreover, as the fine bubble diffusing device using such a fine bubble diffusing tube, for example, a device, disclosed by Patent Document 1, has been known. As shown in FIG. 19, this fine bubble diffusing device directs air supplied from a main gas supply pipe 10 to a plurality of branch pipes 9 disposed on the two sides thereof, and the resulting air is diffused and discharged through the fine slits of the fine bubble diffusing tube 6 placed so as to communicate with the branch pipes 9.

However, in the above-mentioned fine bubble diffusing tube and fine bubble diffusing device, in the case when the length of the diffusing tube in the longitudinal direction (direction along the center axis of the cylindrical supporting tube) exceeds a predetermined length (1000 mm), although sufficient bubbles are generated from the fine slits located at a position (base side) close to the air supply unit, the amount of bubbles to be generated from the fine slits located at a position (tip side) far away from the air supply unit becomes smaller, resulting in a problem in that the amount of bubbles to be generated is made extremely uneven.

On the other hand, a submerged membrane separation apparatus that is immersed and placed in a treatment tank 8, as shown in FIG. 20, has been conventionally known as a water treatment device that carries out a filtration treatment on polluted water, such as sewage, excrement, or industrial wastewater, by using a membrane. In FIG. 20, the submerged membrane separation apparatus is immersed in a treated liquid stored in the treatment tank 8. A membrane module 23 in which a plurality of flat plate-shaped filtration membranes 22 are disposed side by side so as to be in parallel with the membrane faces is provided with a permeated water outlet 26, and an effluent piping 24 and a suction pump 25 are allowed to communicate with the permeated water outlet 26.

A treated liquid supply pipe 21 is opened above the treatment tank 8. Upon activation of the suction pump 25 serving as a driving force for filtration, the treated liquid inside the treatment tank is filtrated through the flat plate-shaped filtration membranes 22 disposed inside the membrane module 23 so that the filtrate is taken out of the system through the permeated water outlet 26 and the effluent piping 24.

The diffusing tube 6 is placed below the membrane module 23, and during a filtration operation, air supplied from the blower 7 is sent to the diffusing tube 6 through the gas supply pipe 10 and the branch pipe 9 so that the air is discharged into the treatment tank (aeration tank) 8 from the diffusing pores of the diffusing tube. An upward-moving stream of a gas-liquid mixture is generated by the air lift effect of the discharged air and this upward-moving stream of the gas-liquid mixture and bubbles act as cleaning flows on the surfaces of the filtration membranes, so that the adhesion or deposition of a cake layer onto the membrane surfaces is suppressed for a stable filtration operation (see Patent Document 2).

Relatively coarse bubbles are effective in increasing the cleaning flow effect on the membrane surfaces, and therefore, coarse bubble-generating diffusing tubes have been used. It is also proposed that fine bubble-generating diffusing tubes should be used to reduce the amount of the diffused gas. Even in such a case, the fine bubble diffusing tubes are used in combination with coarse bubble diffusing tubes so that coarse bubbles can act on the membrane surfaces (see Patent Documents 3 and 4). In such an apparatus, diffusing tubes having small diffusing holes or membrane type diffusing device plates are used as the fine bubble diffusing tubes, and such diffusing devices are placed at a predetermined location under the submerged membrane separation apparatus.

In general, fine bubble diffusing tubes are also used in a diffusing device system for supplying oxygen to microorganisms in an activated sludge liquid in a treatment tank. For example, as shown in FIG. 20, as the fine bubble diffusing tubes for the activated sludge treatment, known fine bubble diffusing tubes are so configured that air supplied from a single main gas-supply pipe 10 is guided to a plurality of branch pipes 6 placed on both sides of the pipe and diffused from fine diffusing holes formed in the surfaces of the branch pipes (see Patent Document 1). When the fine bubble diffusing tubes have such a structure, fine bubbles are not diffused from the central region where the main gas-supply pipe 10 is located; however, as long as oxygen is supplied to an activated sludge liquid, no problem is raised. However, when such a diffusing device is placed under a submerged membrane separation apparatus as shown in FIG. 20, the air lift effect is hardly produced at the central portion of the diffusing device where no fine bubbles are diffused, with the result that it is not possible to obtain the cleaning flow effect on the membrane surfaces. As a result, a problem occurs in which membrane surface cleaning is insufficient in the central portion of the submerged membrane separation apparatus so that the filtration function of the separation membrane is lowered.

Moreover, as the diffusing device to be placed below the submerged membrane separation apparatus, a device disclosed in Patent Document 5 has been known. This diffusing device has a structure in which, although the two ends of the diffusing tube are connected to gas supply pipes, the gas supply can be carried out only from one side, with no gas supply being available from both of the sides. The gas supply only from one side makes it difficult to generate bubbles from the entire diffusing tube, and consequently makes it also difficult to exert cleaning flow effects on the entire separation film on the upper portion of the diffusing tube. Moreover, the device described in Patent Document 5 also has a structure in which, for example, a connecting process using a thread opening is carried out on each of the connecting portions Y on the two ends; however, the connecting process by the use of the thread opening is carried out by rotating the gas supply unit 4 or the branch pipe 9 so that it is shifted in parallel with the longitudinal direction α of the supporting tube 1 so as to be thread-engaged. In the case when this thread-engaging process is used in both of the ends, if a single fine bubble diffusing tube is attached to the branch pipe 9 at each of the two ends, the connecting process is carried out without causing any problems; however, this structure makes it difficult to connect two or more fine bubble diffusing tubes arranged in parallel with one after another at their two ends.

Patent Document 1: JP-A No. 2005-081203
Patent Document 2: JP-A No. 10-296252
Patent Document 3: JP-A No. 2001-212587
Patent Document 4: JP-A No. 2002-224685
Patent Document 5: JP-A No. 2006-263716

SUMMARY OF THE INVENTION

The invention provides a fine bubble diffusing tube and a diffusing device that can suppress unevenness of the amount of bubbles even when the length of the diffusing tube for generating fine bubbles is made longer, and also generate fine bubbles with an even amount of bubbles, and in particular, also to provide such fine bubble diffusing tube and diffusing device that are desirably used as the fine bubble diffusing tube to be installed vertically below a large-size separation membrane module. By installing such fine bubble diffusing tube and diffusing device in a submerged membrane separation apparatus, it is possible to provide such a submerged membrane separation apparatus as to generate fine bubbles evenly and uniformly from vertically below the separation membrane module.

The fine bubble diffusing tube, the fine bubble diffusing device and the submerged membrane separation apparatus in embodiments of the present invention have the features described below.

(1) A fine bubble diffusing tube including: at least a cylindrical supporting tube, and an elastic sheet with fine slits formed therein, with the elastic sheet being placed so as to cover the outer circumference of the supporting tube, so that, upon supplying a gas to a space between the elastic sheet and the supporting tube, the fine slits of the elastic sheet are opened to generate fine bubbles outside the diffusing tube, and in this structure, the supporting tube has a length of 1000 mm or more in the longitudinal direction, with gas supply units serving as flow inlets of the gas being attached to the two ends of the supporting tube.

(2) The fine bubble diffusing tube described in item (1), wherein the space between the elastic sheet and the supporting tube is divided into at least two portions in the longitudinal direction, with the length of each of the divided spaces in the longitudinal direction being set to 1000 mm or less.

(3) A fine bubble diffusing device including: a plurality of fine bubble diffusing tubes described in item (1) or (2) that are disposed virtually in parallel with one another, with gas supply units of the fine bubble diffusing tube being connected to gas supply pipes, and in this structure, a plurality of the gas supply units, located on one end side of the fine bubble diffusing tube, are all connected to one gas supply pipe, with a plurality of the gas supply units, located on the other side thereof, being all connected to another gas supply pipe.

(4) The fine bubble diffusing device described in item (3), wherein, with respect to at least one end side, a connecting portion between the gas supply unit of the fine bubble diffusing tube and the gas supply pipe has a connecting structure capable of being detachably attached by inserting a member of the connecting portion thereto, without being rotated.

(5) The fine bubble diffusing device described in item (4), wherein the connecting portion having the connecting structure capable of being detachably attached by inserting the member of the connecting portion thereto, without being rotated, is provided with an O-ring placed thereon as a sealing member.

(6) The fine bubble diffusing device described in item (3), wherein, with respect to at least one end side, a connecting portion between the gas supply unit of the fine bubble diffusing tube and the gas supply pipe has a connecting structure in which connecting ends are joined to one another without rotating a member of the connecting portion, and connected to each other by using a connecting member capable of being detachably attached.

(7) The fine bubble diffusing device described in item (6), wherein the connecting member capable of being detachably attached, is at least one member selected from the group consisting of a flange, a union and a clamp.

(8) A fine bubble diffusing device including: a plurality of fine bubble diffusing tubes described in item (2) that are disposed virtually in parallel with one another, with gas supply units of the fine bubble diffusing tube being connected to gas supply pipes, and in this structure, a plurality of the gas supply units, located on one end side of the fine bubble diffusing tube, are all connected to one gas supply pipe, with a plurality of the gas supply units, located on the other side thereof, being all connected to another gas supply pipe, and with respect to the two gas supply pipes, a plurality of the fine bubble diffusing pipes connected to the gas supply pipe have space portions closest to the gas supply unit having lengths in the longitudinal direction whose differences in the total sum are set within 10%.

(9) A submerged membrane separation apparatus, which is submerged and placed in a treatment tank storing a treated liquid, includes a separation membrane module in which a plurality of separation membrane elements, each formed by placing a flat film as a separation membrane, are disposed in parallel with one another in parallel with the membrane face, and a fine bubble diffusing device placed vertically below the submerged membrane separation apparatus, and this structure is characterized in that the fine bubble diffusing device is prepared as a fine bubble diffusing device described in item (3).

(10) The submerged membrane separation apparatus described in item (9) wherein the two gas supply pipes are connected to each other by branches from the main gas supply pipe that extends from an aeration device.

(11) The submerged membrane separation apparatus described in item (9), wherein the distance between the lower end of the separation membrane element and the fine bubble diffusing tube is set to 300 mm or less.

The fine bubble diffusing tube in an embodiment of the present invention makes it possible to suppress unevenness of the amount of bubbles even if it is prepared as an elongated diffusing tube for generating fine bubbles, and consequently to generate fine bubbles with a uniform amount of bubbles. Moreover, this fine bubble diffusing tube is disposed vertically below the submerged membrane separation apparatus; therefore, even in the case of a submerged membrane separation apparatus provided with a large-size submerged membrane separation apparatus, fine bubbles can be activated on each portion on the membrane face of the separation membrane so that a uniform washing process is achieved, and since a stable membrane filtrating operation is carried out, it becomes possible to achieve a long service life of the submerged membrane separation apparatus.

BRIEF DESCRIPTION OF THE DRAWINGS

FIG. 6(a) shows a method in which a flange is used, FIG. 6(b) shows a method in which a union is used, and FIG. 6(c) shows a method in which a clamp is used;

FIG. 12 is a schematic outside drawing that shows gas supply pipes in an Example;

DESCRIPTION OF REFERENCE SYMBOLS

Figure 1:
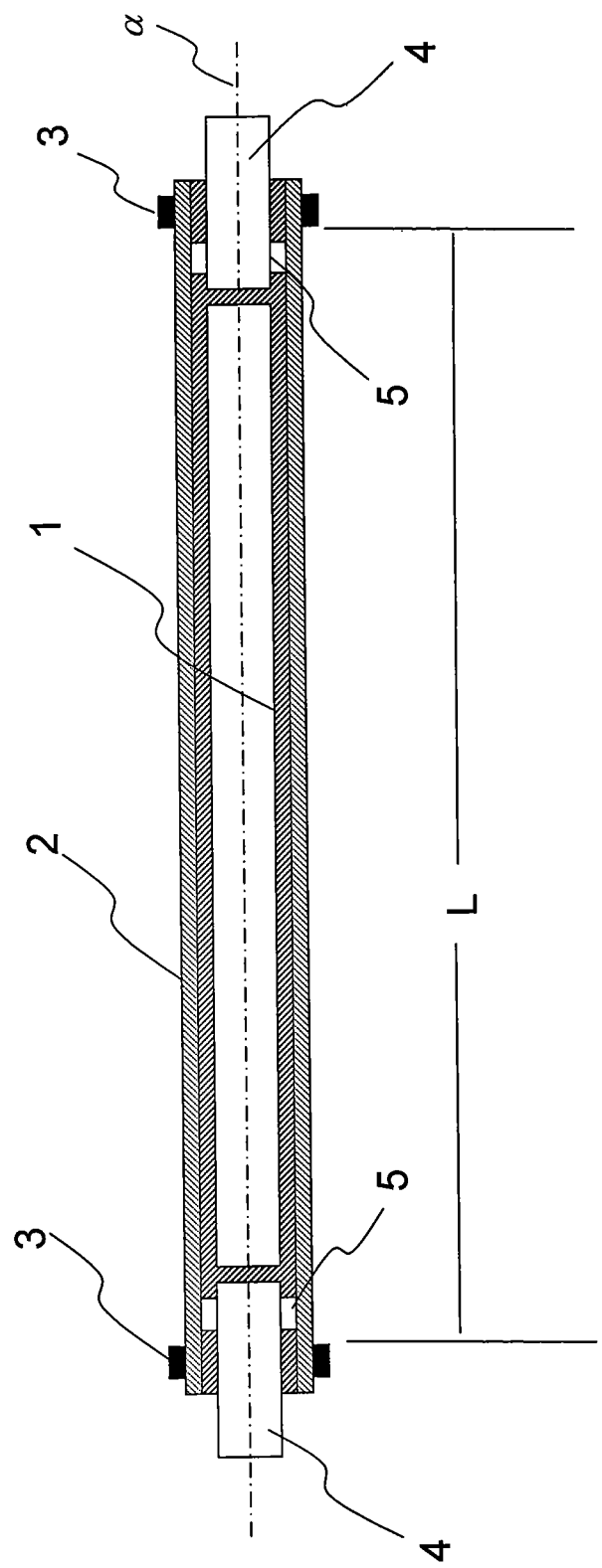
FIG. 1 is a longitudinal cross-sectional view along the longitudinal central axis that shows one embodiment of a fine bubble diffusing tube of the present invention.

1: Supporting tube
2: Elastic sheet
3: Tightening metal member
4: Gas supply unit
5: Through hole
α: Longitudinal axis of supporting tube
L: Longitudinal length of supporting tube
S: Fine slit
E: Longitudinal length of a gap portion between elastic sheet 2 and supporting tube 1
X: Area without occurrence of bubbles
6: Fine bubble diffusing tube
7: Blower
8: Treatment tank
9: Branch pipe
10: Gas supply pipe
11: On-off valve
12: O-ring
13: Passage opening for bolt and nut
14: First example of union
15: Clamp
16: Bolt
21: Treated liquid supply pipe
22: Flat-plate-shaped filtration membrane
23: Membrane module
24: Effluent piping
25: Suction pump
26: Permeate outlet
27: Main gas supply pipe
28: Effluent outlet
43: Suction pump
44: Treated water
46: Raw water supply pump
47: Denitrification tank
48: Sludge circulating pump
49: Sludge drawing pump
51: Thread opening 52: Second example of union
53: Gas supply inlet
102: Membrane element
103: Frame
104: Diffusing device
k: Horizontal distance between diffusing tubes
105: Space between elements
106: Casing
107: One side for the area of openings, which is parallel to the direction of the arrangement of the membrane elements 2 and placed above the diffusing device 4
108: Air
109: Turning flows
201: Membrane surface part (membrane surface)
202: Height corresponding to a surface roughness
203: Width corresponding to an average pore size

DETAILED DESCRIPTION OF THE INVENTION

The fine bubble diffusing tube according to the invention is described below based upon one embodiment shown in FIG. 1.

In the fine bubble diffusing tube in an embodiment of the present invention, an elastic sheet 2 with fine slits formed thereon is disposed so as to cover the outer circumference of a cylindrical supporting tube 1, and a gas is supplied to a gap between the elastic sheet 2 and the supporting tube 1. When the gas is supplied, fine bubbles are generated outside of the diffusing tube by allowing the fine slits of the elastic sheet 2 to open. A gas supply unit 4 serving as a flow inlet for the gas is formed on each of the two ends of the supporting tube 1, and from the gas supply unit 4, a through hole 5 is formed so as to direct the gas to the peripheral side of the supporting tube. A tightening member 3 used for sealing the supporting tube 1 and the elastic sheet 2 from each other, is attached to each of the two ends of the tube.

In this case, as the material for forming the supporting tube 1, not particularly limited, any material may be used as long as it has high rigidity so as not to be damaged by a load such as vibrations due to diffusion. Preferable examples thereof include: metals such as stainless, resins such as acrylonitrile butadiene-styrene rubber (ABS resin), polyethylene, polypropylene and vinyl chloride, composite materials, such as fiber reinforced plastics (FRP), or the like.

Moreover, the length in the longitudinal direction of the supporting tube is set to 1000 mm or more. The gas supply units 4 serving as gas flow inlets are formed on the two ends thereof so that the inside of each of the gas supply units 4 and the outer circumferential side of the supporting tube 1 are allowed to communicate with each other through the through hole 5.

As indicated by symbol L in FIG. 1, the length in the longitudinal direction of the supporting tube corresponds to the length of a space prepared for generation of fine bubbles on the outer circumference of the supporting tube. That is, this length is represented by a distance between the mutual inner sides of the tightening members 3 used for sealing the space relative to the elastic sheet 2 on the outer circumference of the supporting tube.

The shape of the supporting tube 1 is preferably formed into a round shape in a cross section having right angles with its longitudinal direction axis a, or may be formed into a virtually polygonal shape. As the material for the gas supply unit 4, metals, resins or the like may be preferably used, and its shape is preferably formed into a hollow pipe shape, or may be formed into a hollow virtually polygonal shape. A structure is exemplified in which one end of the gas supply unit 4 is embedded to the inside of the end of the supporting tube 1, and the other end is directed to the outside of the supporting tube, with the tip of the end embedded to the inside of the supporting tube 1 being sealed, so that a hole that communicates with the through hole 5 is formed on one portion of the outer circumference of the embedded gas supply unit. The through hole 5 is a hole for allowing the inside of the gas supply unit 4 to communicate with the outer circumferential portion of the supporting tube 1, and preferably has a structure that quickly flows out the gas supplied into the gas supply unit 4 toward the outer circumferential portion of the supporting tube 1. A structure is exemplified in which the cross-sectional shape of the through hole 5 on the gas supply unit 4 side and/or the cross-sectional shape of the through hole 5 on the outer circumferential side of the supporting tube 1 are formed into a shape that is elongated in the direction of the longitudinal axis α of the supporting tube 1, with the center portion on the cross section of the through hole 5 on the gas supply unit 4 side being located on the supporting tube end side along the longitudinal axis α of the supporting tube 1, relative to the center portion on the cross section of the through hole 5 on the outer circumferential side of the supporting tube 1.

Moreover, the elastic sheet 2 having fine slits formed therein is placed on the outer circumferential portion of the supporting tube 1 in a manner so as to cover the supporting tube 1. The two ends of the elastic sheet 2 are secured to the supporting tube 1 with tightening metal members 3. Each of the tightening metal members 3 is positioned on the supporting tube end side from the hole on the circumferential side of the supporting pipe 1 of the through hole 5 along the longitudinal direction axis α of the supporting tube 1. With this structure, the gap between the outer circumferential portion of the supporting tube 1 and the elastic sheet 2 is sealed, and allowed to communicate with the inside of the gas supply unit 4 through the through hole 5. The tightening metal members 3 are preferably prepared as ring-shaped metal members (hose bands or the like) capable of being tightened.

In this case, as the material for forming the elastic sheet 2, not particularly limited, any material may be used as long as it has elasticity and is virtually non-air permeable, and for example, any material may be selected on demand among those materials such as synthetic rubbers, like ethylene propylene rubber (EPDM), silicone rubber and urethane rubber, and other elastic materials, and utilized. Among these, ethylene propylene rubber is preferably used because of its chemical resistance.

Figure 2:
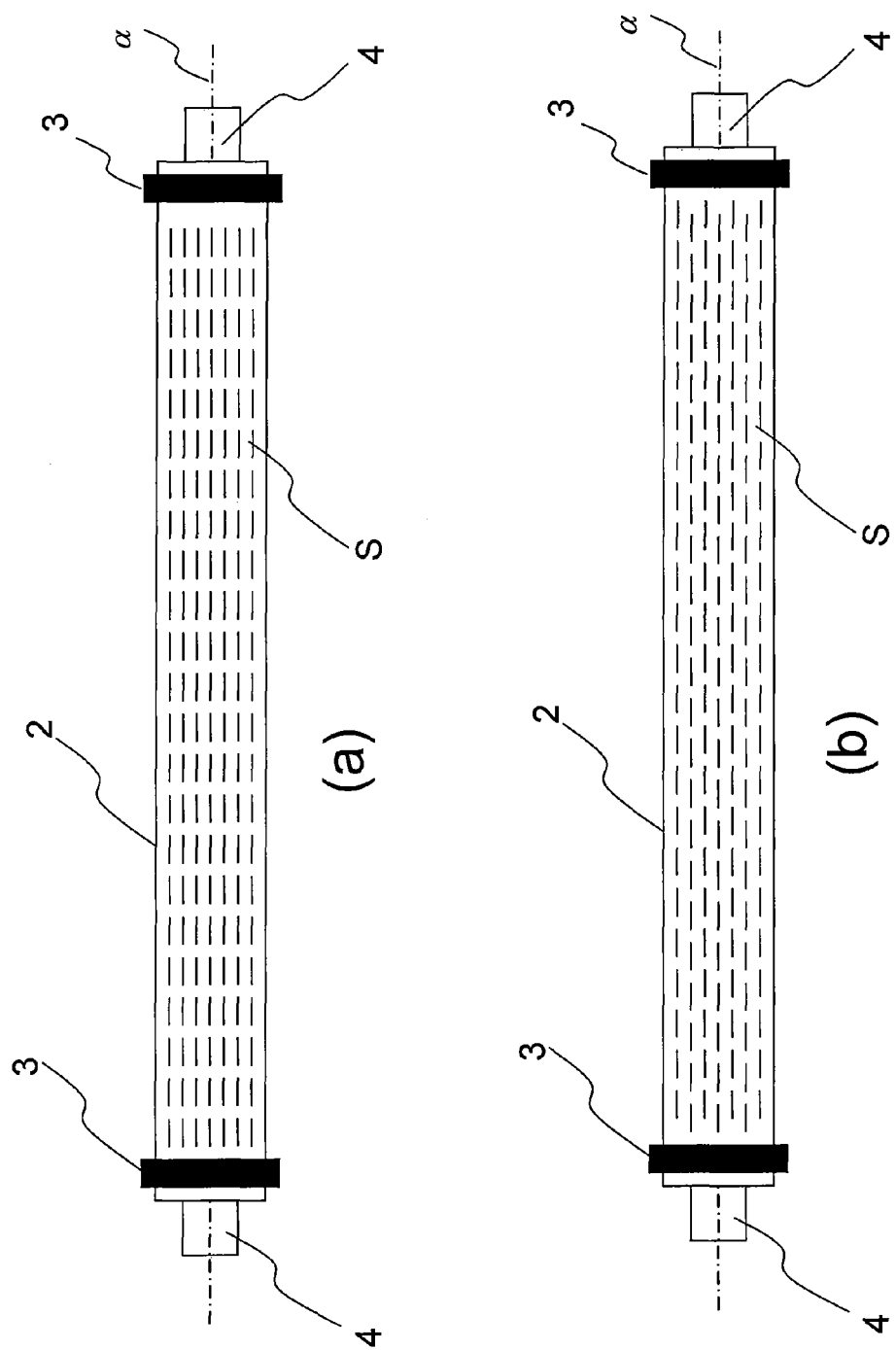
FIG. 2 is a drawing that schematically shows an outside appearance of the fine bubble diffusing tube in accordance with an embodiment of the present invention.

Moreover, as shown in FIG. 2, a plurality of, or a number of fine slits S are formed in the elastic sheet 2. Each fine slit S is preferably designed to have a length in a range from 1 to 5 mm, more preferably, from 2 to 4 mm. When the length of the fine slit is too long, bubbles tend to become too large, or suspension components might intrude into the slit when the fine slit is closed, with the result that clogging tends to occur. In contrast, when the length is too short, a pressure loss becomes large upon generation of bubbles to cause inefficiency. Although not particularly limited, the length direction of the fine slit S is preferably set to be parallel to the longitudinal direction axis α of the supporting tube 1 so that bubbles can be easily generated uniformly as a whole. Moreover, the arrangement of the fine slits S may be made so as to be aligned virtually along a plurality of straight lines, as shown in FIG. 2(a), or may be aligned with a slit position being slightly deviated virtually for each of the straight lines, as shown in FIG. 2(b). Furthermore, although not particularly limited, the interval between the fine slits S is preferably set to 1 mm or more.

In the fine bubble diffusing tube in an embodiment of the present invention, a gas is supplied from the gas supply units 4 on the two ends of the supporting tube 1, and the gas is allowed to pass through the through hole 5, and flow into the space between the supporting tube 1 and the elastic sheet 2. The elastic sheet 2 is expanded by the gas flowed therein, and the fine slits S are opened so that the gas in the space between the supporting tube 1 and the elastic sheet 2 is discharged through the fine slits S into water as fine bubbles. Moreover, in the case when the gas supply to the gas supply units 4 is stopped, the elastic sheet 2 is contracted, and since the fine slits S are closed, suspension substances in the water are prevented from entering the fine slits S and the space between the supporting tube 1 and the elastic sheet 2.

In this manner, in an embodiment of the present invention, since the gas supply units 4 serving as gas flow inlets are formed on the two ends of the supporting tube 1 so that the gas is supplied from the two ends, the unevenness of the amount of bubbles caused by the distance from the gas supply units 4 can be suppressed. As a result, even when the length in the longitudinal direction of the supporting tube 1 is elongated to 1000 mm or more, the unevenness of the amount of bubbles can be suppressed.

Figure 3:
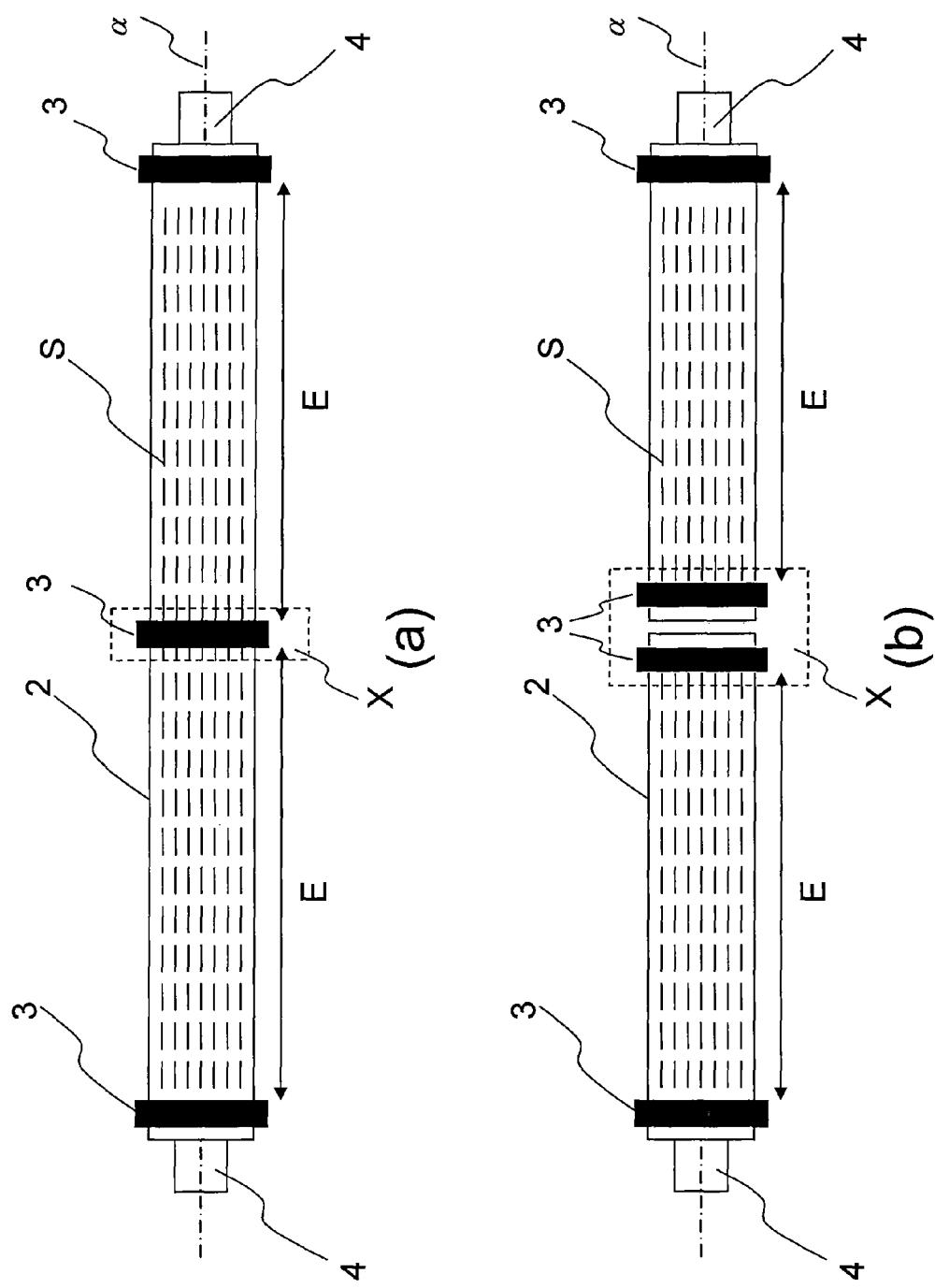
FIG. 3(a) is a drawing that schematically shows an outside appearance of the fine bubble diffusing tube in accordance with an embodiment of the present invention.
FIG. 3(b) is a drawing that schematically shows an outside appearance of a mode in which a conventional fine bubble diffusing tube is connected.

Moreover, in an embodiment of the present invention, as shown in FIG. 3(*a*), by tightening the elastic sheet 2 at the position of a center portion (that is, a portion different from the proximity of each of the two ends) through which bubbles are generated, by using a tightening metal member 3 that is used for tightening the elastic sheet 2 at each of the two ends of the supporting tube 1, the space between the supporting tube 1 and the elastic sheet 2 may be divided in the longitudinal direction into at least two portions. At this time, the length in the longitudinal direction of the divided space is set to 1000 mm or less, preferably, to 800 mm or less. With this structure, the generation of unevenness in bubbles can be further suppressed. In this case, in the proximity of the tightening metal member in the center, even when the elastic sheet 2 is expanded, the fine slits S fail to be sufficiently opened to hardly generate bubbles; therefore, the tightening metal member in the center is preferably designed to have a thin width.

Figure 18:
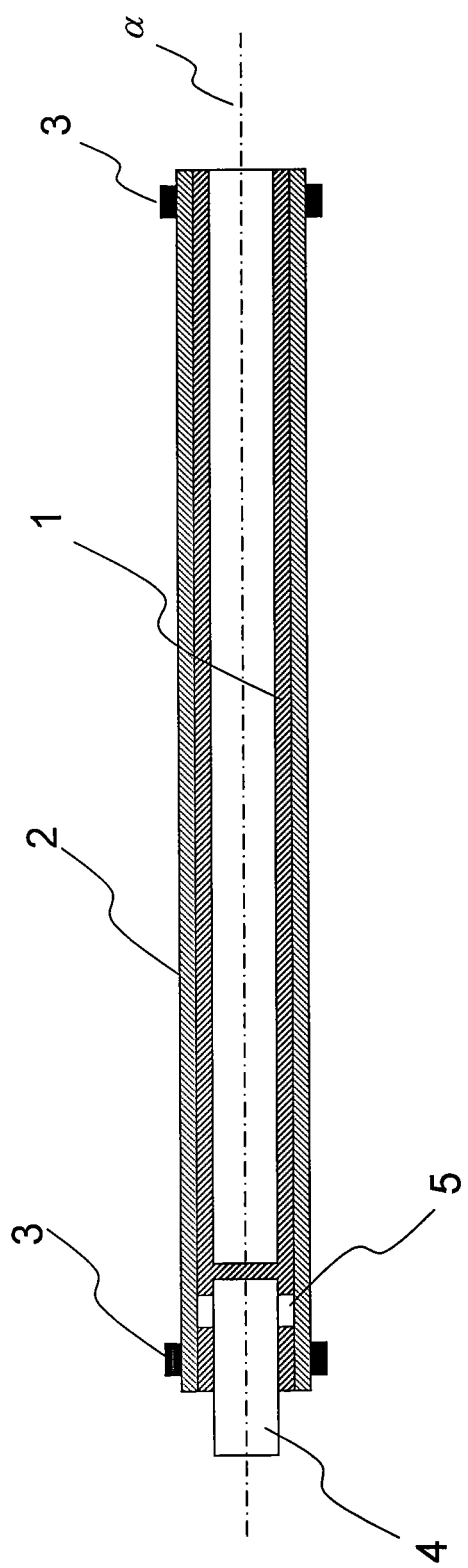
FIG. 18 is a longitudinal cross-sectional view along the longitudinal central axis that shows one embodiment of a conventional fine bubble diffusing tube.
Figure 19:
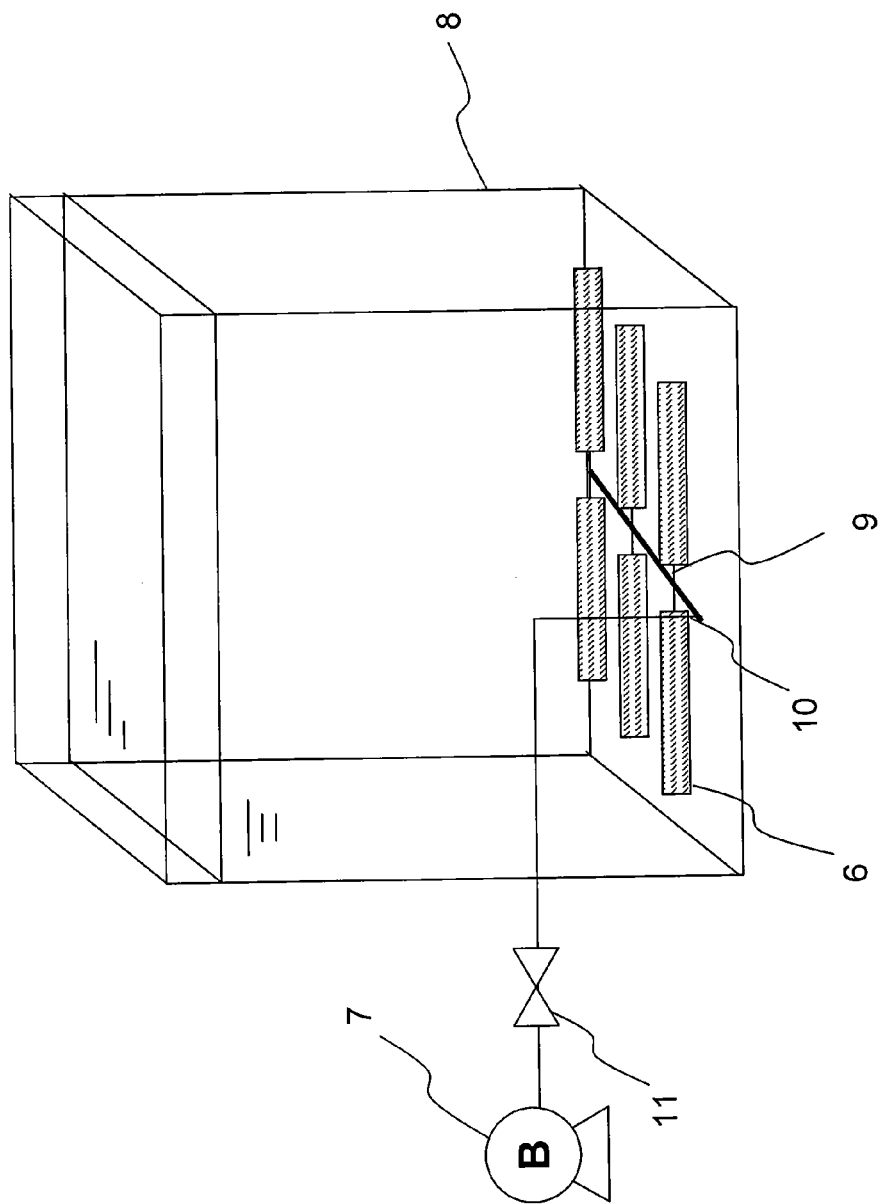
FIG. 19 is a schematic perspective view that shows an installed state of a conventional fine bubble diffusing device.
Figure 20:
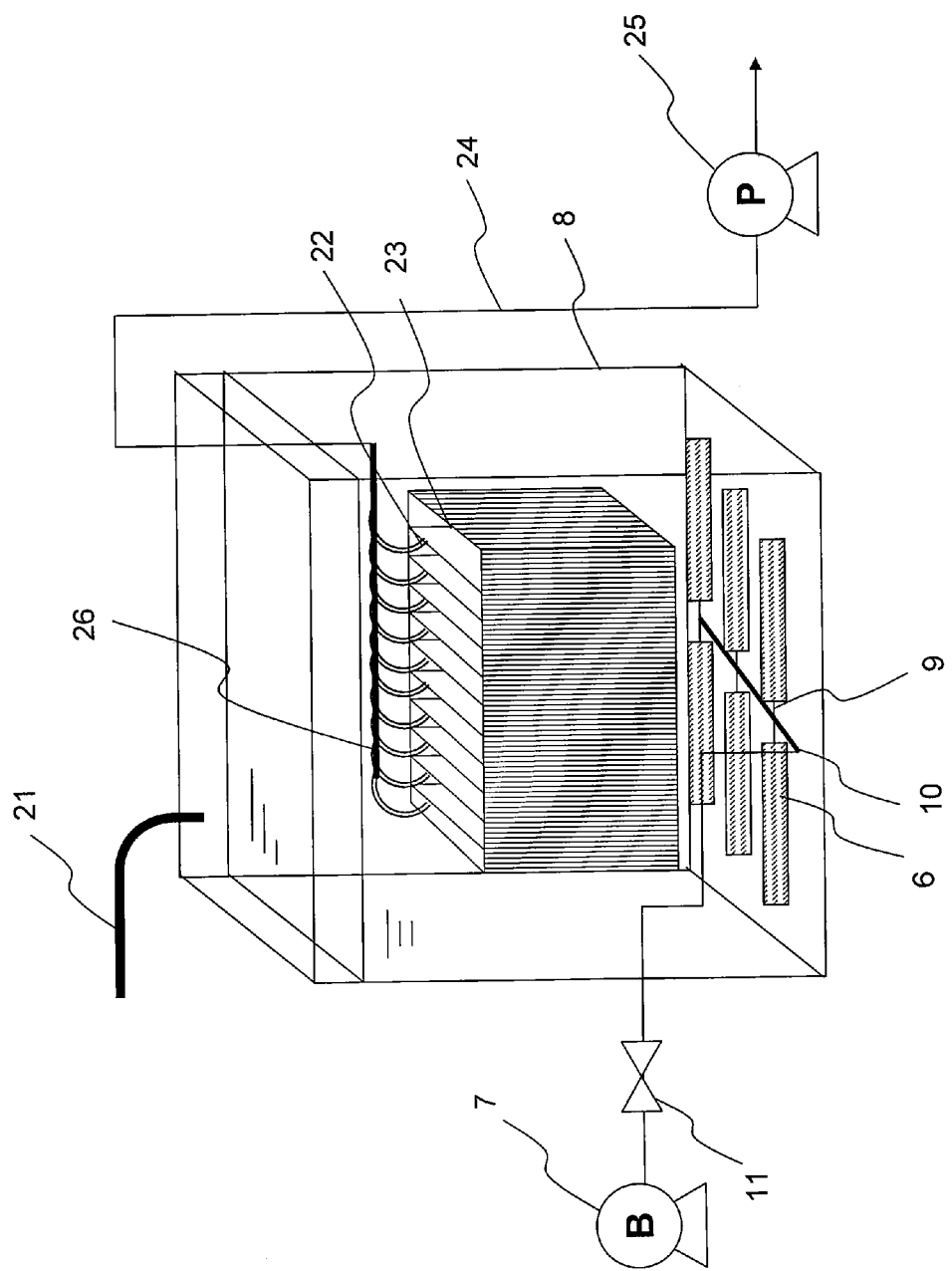
FIG. 20 is a schematic drawing that shows a submerged membrane separation apparatus in which the conventional fine bubble diffusing device is installed.

On the other hand, in the case when, as shown in FIG. 18, two tip ends of conventional fine bubble diffusing tubes are connected to each other (see FIG. 3(*b*)), since two tightening metal members 3 and connecting members therebetween are located near the connected center portion, the resulting problem is that portions that generate no bubbles (bubble un-generation area X) become a size that is not ignorable, failing to provide a preferable method from the viewpoint of generating uniform bubbles.

Figure 4:
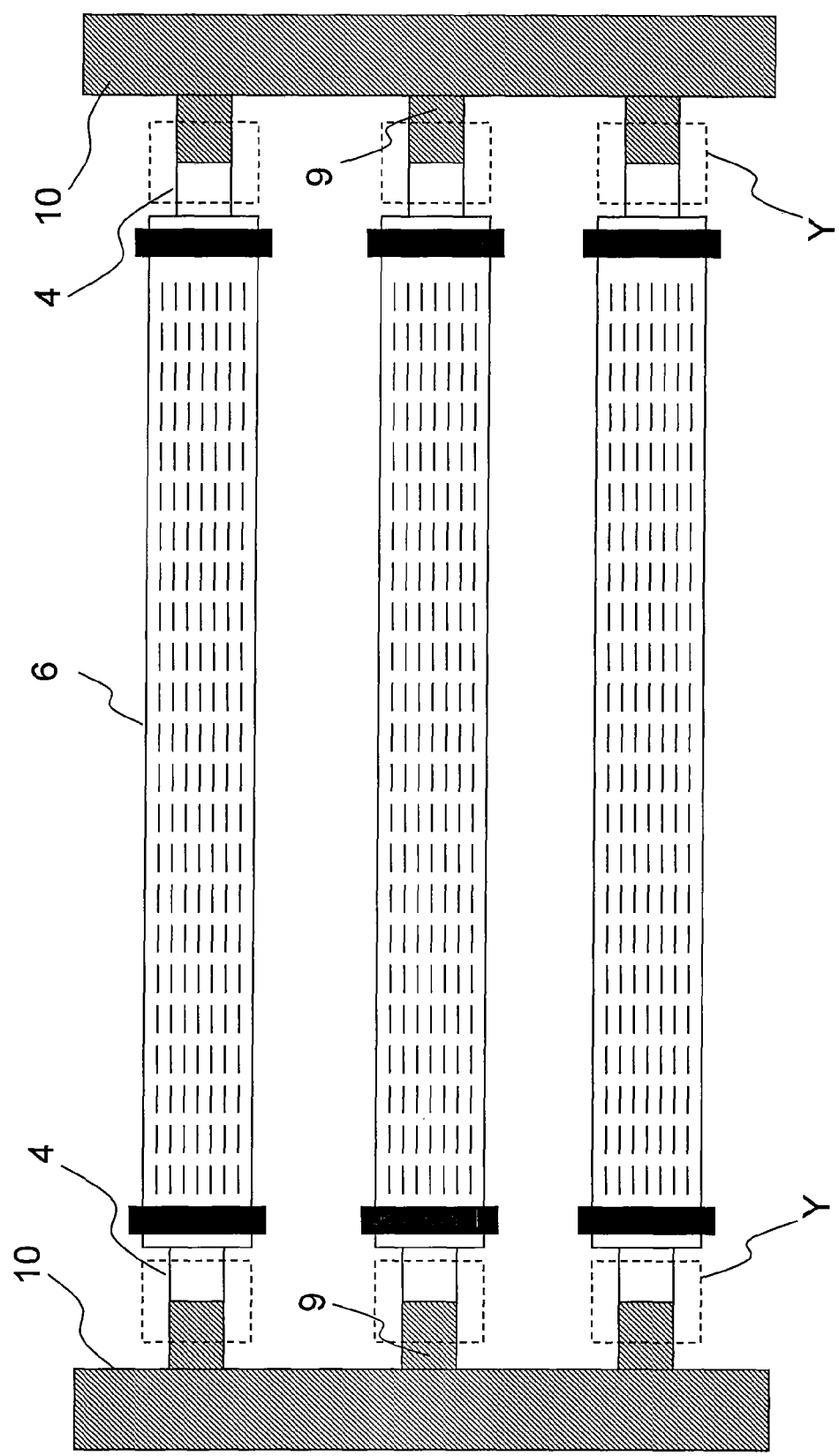
FIG. 4 is a drawing that schematically shows an outside appearance of a fine bubble diffusing tube in accordance with another embodiment of the present invention.

Based upon one embodiment shown in FIG. 4, the following description will discuss the fine bubble diffusing device of the present invention in which a plurality of fine bubble diffusing tubes of the present invention are disposed.

In the fine bubble diffusing device in an embodiment of the present invention, two or more of the fine bubble diffusing tubes 6 of the present invention are disposed virtually in parallel with one another. One of the gas supply units 4 of each fine bubble diffusing tube 6 and at least one of the other fine bubble diffusing tubes 6 are connected to one gas supply pipe 10. That is, two or more fine bubble diffusing tubes 6 are connected to one gas supply pipe 10 through a branch pipe 9. The branch pipe 9 is a pipe branched from the gas supply pipe 10 so as to provide connection.

In this case, the gas supply pipe 10 and the branch pipe 9 may be formed by using a material that has high rigidity so as not to be damaged by a load such as vibrations due to diffusion. Preferable examples thereof include: metals such as stainless, resins such as acrylonitrile butadiene-styrene rubber (ABS resin), polyethylene, polypropylene and vinyl chloride, composite materials, such as fiber reinforced plastics (FRP), or the like. The branch pipe 9 and the gas supply pipe 10 are prepared as hollow pipes, and mutually connected so that the insides thereof are allowed to communicate with each other.

Moreover, two connecting portions Y between the branch pipe 9 and the gas supply unit 4 of the fine bubble diffusing tube 6 are prepared per one fine bubble diffusing tube, and at least one of these is preferably allowed to have either one of the following two connecting structures:

(i) a connecting structure capable of being detachably attached by inserting a member of the connecting portion to be fitted thereto, without being rotated. That is, without rotating the gas supply unit 4 or the branch pipe 9, this connecting structure is capable of being detachably attached, by shifting the gas supply unit 4 or the branch pipe 9 in the longitudinal direction α of the supporting tube 1.

(ii) a connecting structure in which connecting ends are mutually joined and connected to each other, without the necessity of rotating the members of the connecting portions by using a connecting tool that allows a detachably attaching process. That is, by aligning the connecting ends in parallel with the longitudinal direction α of the supporting tube 1, these are joined to each other by using the connecting tool that allows a detachably attaching process, without rotating or moving the gas supply unit 4 or the branch pipe 9.

As a connecting structure that uses neither (i) structure nor (ii) structure, for example, a connecting structure is proposed in which a thread opening is used in each of the connecting portions Y on the two ends. The connecting process by the use of the thread opening is carried out by rotating the gas supply unit 4 or the branch pipe 9 so that it is shifted in parallel with the longitudinal direction α of the supporting tube 1 so as to be thread-engaged. In the case when this thread-engaging process is used in both of the ends, if a single fine bubble diffusing tube is attached to the branch pipe 9 at its two ends, the connecting process is carried out without causing any problems; however, this structure makes it difficult to connect two or more fine bubble diffusing tubes arranged in parallel with one after another at their two ends.

Figure 5:
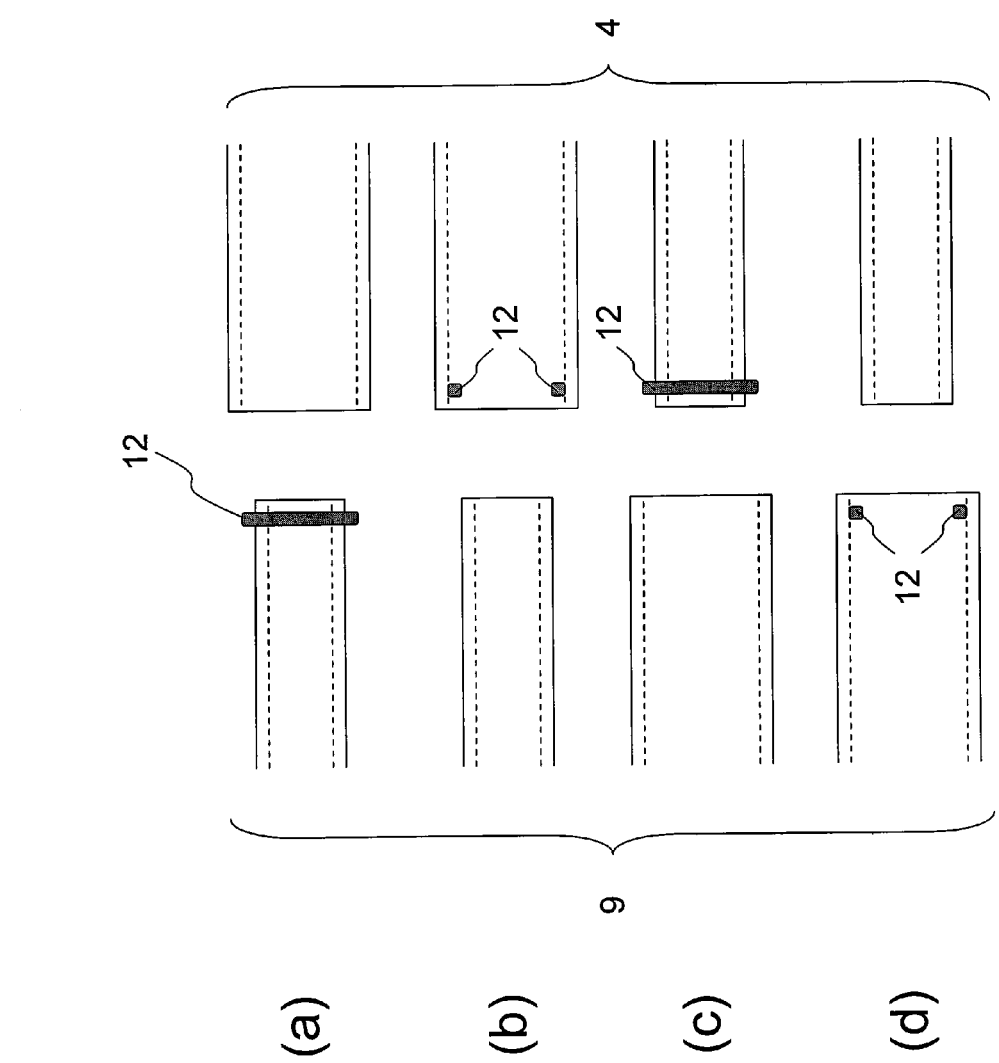
FIGS. 5(a) to 5(d) are cross-sectional views that exemplify a method for connecting a gas supply unit 4 of a fine bubble diffusing tube and a branch pipe 9 of a gas supply pipe.

As the connecting method that satisfies the above-mentioned (i) structure, a connecting method is preferably proposed in which the connecting ends are mutually inserted and fitted to each other, and sealed with an O-ring 12. Those specific connecting methods use a structure in which, as shown in FIGS. 5(*a*) to 5(*d*), the connecting end on the gas supply unit 4 side and the connecting end on the branch pipe 9 side are allowed to have a male/female thread relationship, and the O-ring 12 is placed on either one of them so that, upon insertion of the male tube to the female tube, the O-ring 12 and the respective pipes are tightly made in contact with each other to form a structure free from leakage of gas from the pipes. As the material for the O-ring 12, rubber and resins having an elastic property are preferably used, and specific examples include: silicone rubber, urethane rubber, ethylene propylene rubber (EPDM) and the like.

The following description will discuss connecting operations upon connection by using the connecting method of the above-mentioned (i) structure, in the case when all the connections between one of the branch pipes 9 of the gas supply pipe 10 and the gas supply unit 4 are carried out by using the above-mentioned (i) structure. One of the connecting ends of the branch pipe 9 having the above-mentioned (i) connecting structure is referred to as a branch pipe end A, and the other connecting end is referred to as a branch pipe end B. Upon attaching the fine bubble diffusing pipe 6 thereto, first, the gas supply unit 4 on one end side of the fine bubble diffusing tube 6 is connected to the branch pipe end B, and the branch pipe end A is then pushed into the gas supply unit 4 on the other end side of the fine bubble diffusing tube 6 in the longitudinal direction of the supporting tube so that they are inserted and fitted to each other. Upon detaching the fine bubble diffusing tube 6 therefrom, first, the branch pipe end A is pulled out in the longitudinal direction of the supporting tube so that the connection is removed from the gas supply unit 6, and the connection to the branch pipe end B is then removed so that the fine bubble diffusing tube 6 is detached.

Figure 6:
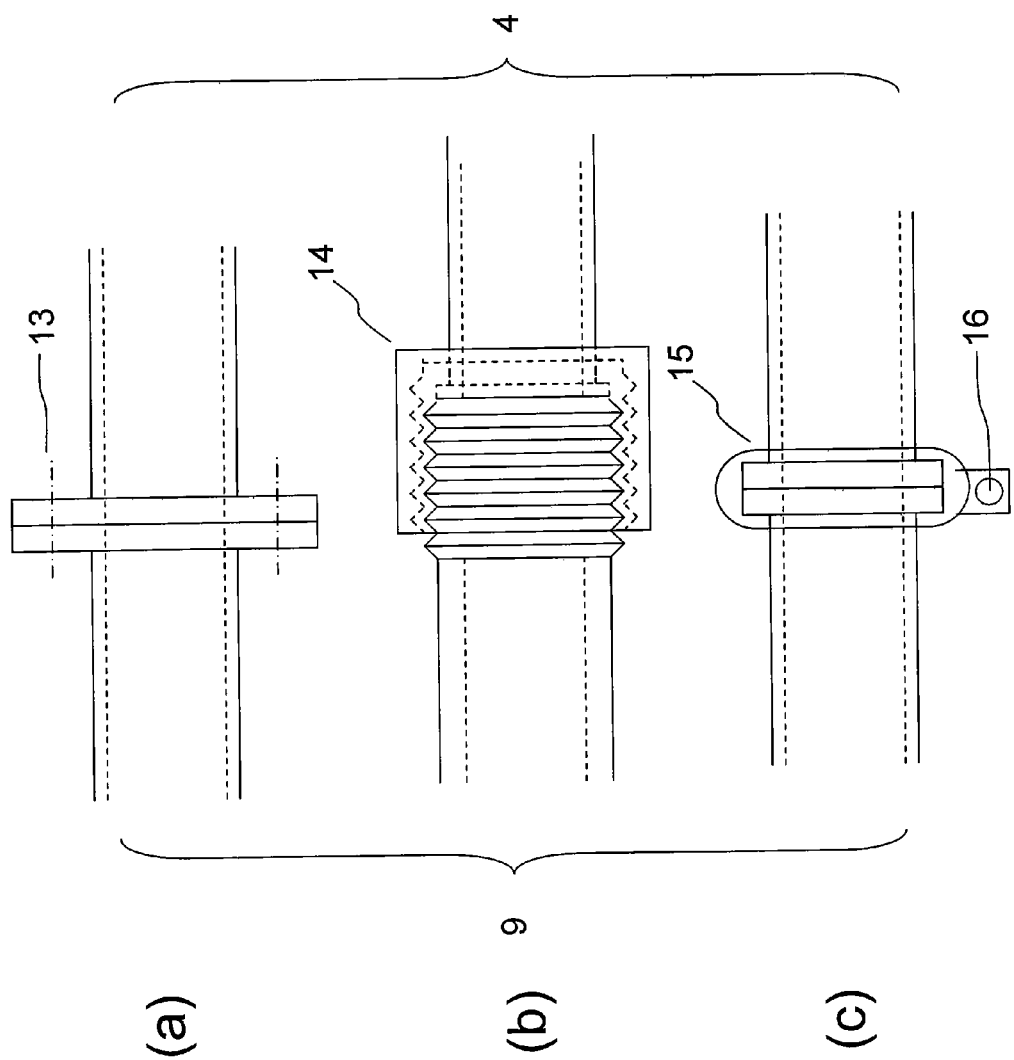
FIGS. 6(a) to 6(c) are partial cross-sectional views that exemplify methods for connecting a gas supply unit 4 of a fine bubble diffusing tube and a branch pipe 9 of a gas supply pipe.

Moreover, in the case of the connecting method using the above-mentioned (ii) structure, any of a flange, a union and a clamp may be preferably used as a connecting tool capable of being detachably attached. The connection using a flange is explained as indicated by FIG. 6(a), and a portion of the flange indicated by reference numeral 13 is connected by using the force of bolt and nut or the like. Between the flanges, a rubber packing, an O-ring or the like is preferably sandwiched so as to enhance air-tightness. The connection using a union is explained as indicated by FIG. 6(b), and first, the end of the branch pipe 9 and the end of the gas supply unit 4 are made in contact with each other, and the connection between the branch pipe 9 and the gas supply unit 4 is strengthened by tightening these by using a union 14 with internal threads formed therein. In contact portions between the branch pipe 9 and the gas supply unit 4, a rubber packing, an O-ring or the like is preferably sandwiched so as to enhance air-tightness. The connection using a clamp is explained as indicated by FIG. 6(c), and the end of the branch pipe 9 and the end of the gas supply unit 4 are made in contact with each other, and after a clamp 15 has been placed in a manner so as to cover the connecting portion, the bolt portion 16 is tightened so that the connection between the branch pipe 9 and the gas supply unit 4 is strengthened. In contact portions between the branch pipe 9 and the gas supply unit 4, a rubber packing, an O-ring or the like is preferably sandwiched so as to enhance air-tightness.

In the case when connecting operations are carried out by the connecting method using the above-mentioned (ii) structure, in the same manner as in the above-mentioned (i) structure, it is not necessary to provide all the connecting portions between the branch pipe 9 and the gas supply unit 4 by using the connecting method of the above-mentioned (ii) structure, and it is only necessary to connect at least either one of the gas supply units 4 on the two sides of the fine bubble diffusing tube 6 by using the connecting method of the above-mentioned (ii) structure. In this case, upon attaching the fine bubble diffusing tube 6, the connecting side by the use of the connecting method of the above-mentioned (ii) structure is formed secondly. Upon detaching it, the connecting side by the use of the connecting method of the above-mentioned (ii) structure is first released. By using this method, the gas supply unit 4 of the fine bubble diffusing tube 6 and the branch pipe 9 of the gas supply pipe 10 can be detachably connected to each other.

Figure 7:
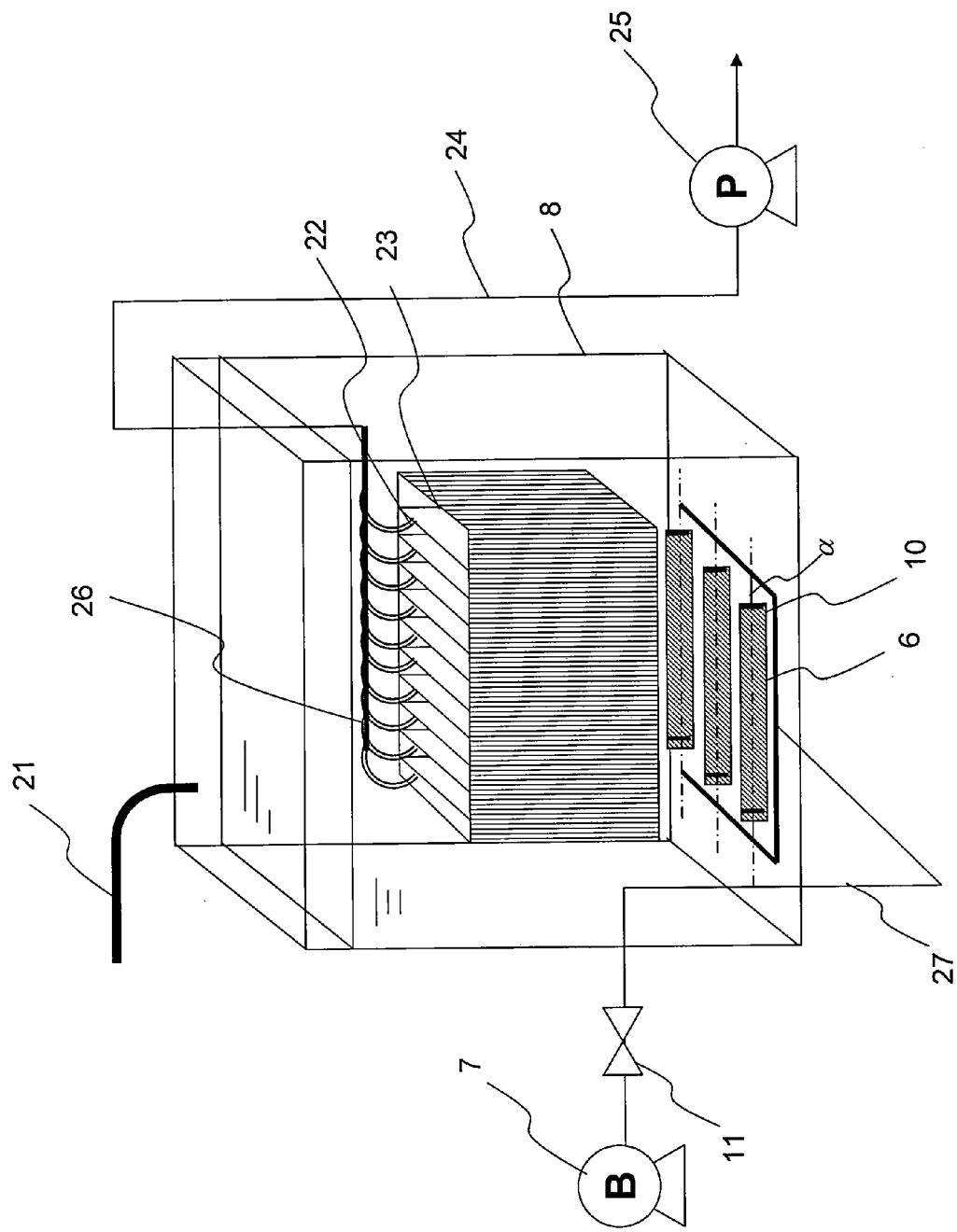
FIG. 7. is a schematic perspective view that shows one example of a submerged membrane separation apparatus of the present invention.

Based upon one embodiment shown in FIG. 7, the following description will discuss the submerged membrane separation apparatus of the present invention provided with the above-mentioned fine bubble diffusing device.

FIG. 7 is a schematic perspective view showing one embodiment of the submerged membrane separation apparatus relating to the present invention. In FIG. 7, the submerged membrane separation apparatus is submerged into a treated membrane filtration liquid inside the treatment tank 8. This submerged membrane separation apparatus is provided with a membrane module 23 in which a plurality of flat-plate-shaped filtration membranes 22 are disposed side by side so as to make membrane faces in parallel with each other in the vertical direction and an effluent piping 24 that communicates with a permeate outlet 26 of the flat-plate-shaped filtration membrane 22. A treated liquid supply pipe 21 has an opening above the treatment tank 8. Moreover, by operating a suction pump 25 serving as a driving force of filtration, the inside of the effluent piping 24 is pressure-reduced so that the treated liquid inside the treatment tank 8 is filtrated by the separation membrane. The filtrate is taken out of the system through the permeate outlet 26 and the effluent piping 24.

Not particularly limited, the treatment tank 8 may be made of any material that makes it possible to store a treated membrane filtration liquid, such as waste water and an activated sludge mixture liquid, and preferably, a concrete tank, a fiber-reinforced plastic tank or the like is used.

The suction pump 25 attached to the effluent piping 24 may be of any type that makes it possible to reduce the pressure in the effluent piping 24. Alternatively, the pressure in the effluent piping 24 may be reduced using a water head pressure difference caused by siphonage, in place of the suction pump 25.

Figure 8:
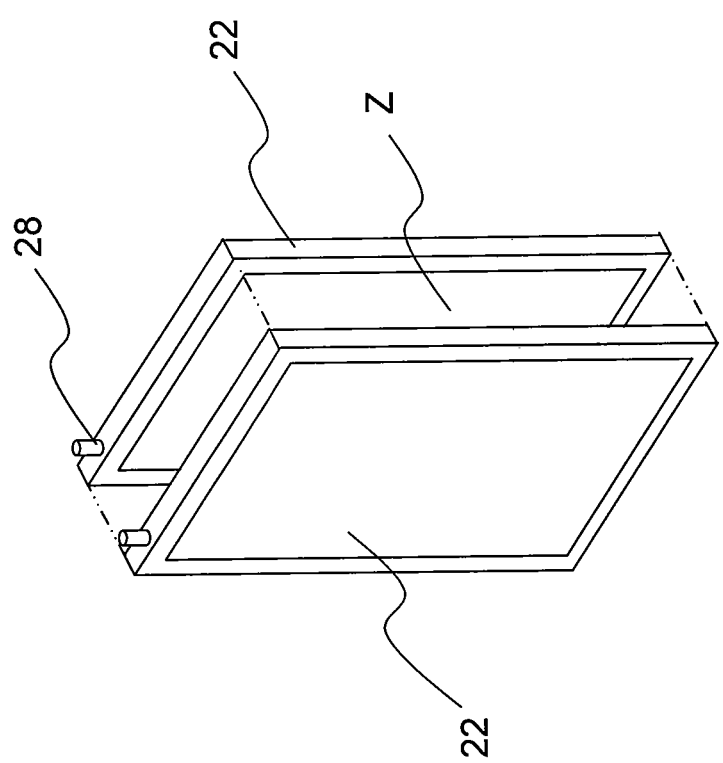
FIG. 8 is a schematic perspective view that shows two sheets of adjacent membrane elements inside a membrane module of the submerged membrane separation apparatus in one embodiment of the present invention.

On the upper side of the submerged membrane separation apparatus, a membrane module 23 in which a plurality of flat plate-shaped filtration membranes 22 are arranged in parallel with the membrane surfaces parallel to the vertical direction is formed. The flat plate-shaped filtration membranes 22, which are elements, each composed of flat sheet-shaped separation membranes, are prepared as flat sheet-shaped filtration membranes 22 having a structure in which, for example, a frame made of a resin, metal or the like, is prepared, and sheet-shaped separation membranes are formed on both of the front and back sides of the frame, with an effluent outlet 28 that is formed at an upper portion of the frame being allowed to communicate with the internal space surrounded by the separation membranes and the frame. FIG. 8 (a schematic perspective view) shows adjacent two pieces of the flat plate-shaped filtration membranes 22. A predetermined space is provided between the adjacent flat plate-shaped filtration membranes 22, and an upward-moving stream of the liquid to be treated, specifically, an upward-moving stream of a fluid mixture of bubbles and the liquid to be treated, flows through the space Z between the membranes. In the apparatus structure according to the invention, gas-diffusing holes can be evenly provided over regions vertically below all the spaces Z between the membranes, and a stream of a gas-liquid mixture containing fine bubbles is allowed to flow through all the spaces Z between the membranes upward, so that the fine bubbles can evenly act on the membrane surface.

In order to increase the filtration area per installation area of the membrane module 23, it is preferred that the distance between the flat plate-shaped filtration membranes 22 should be narrowed so that more flat plate-shaped filtration membranes 22 can be placed; however, if the distance between the membranes is too short, the fine bubbles or the gas-liquid mixture streams cannot sufficiently act on the membrane surfaces of the flat plate-shaped filtration membranes 22, with the result that membrane surface cleaning may be insufficient to rather reduce the filtration performance. For sufficient filtration, therefore, the distance between the membranes is preferably set from 1 to 15 mm, more preferably, from 5 to 10 mm.

In order to improve the handleability or physical durability of the separation membranes, for example, each of the flat plate-shaped filtration membranes 22 has a flat membrane element structure in which the separation membranes are placed on both of the front and back sides of a frame or a flat plate with their periphery bonded and fixed thereto. Not particularly limited, the flat membrane element structure may have a filtrate flow path member interposed between the flat plate and the filtration membrane. Such a flat membrane element structure is preferably used in one embodiment of the present invention, because a high stain-removing effect can be produced by a shear force, when a flow rate is applied parallel to the membrane surface in such a flat membrane element structure.

A plurality of fine bubble diffusing tubes 6 in an embodiment of the present invention are placed vertically below the membrane module 23. The fine bubble diffusing tubes 6 are connected to gas supply pipes 10 through branch pipes 6 respectively. The gas supply pipes 10 are arranged opposite to each other so that the region vertically below the separation membrane module 23 is held between them. Specifically, as shown in FIG. 7, the fine bubble diffusing tubes 6 are preferably disposed so that the membrane faces are made perpendicular to the supporting tube longitudinal direction a and so that fine slits S formed in the fine bubble diffusing tubes 6 are located over regions vertically below the membrane space Z (see FIG. 8) formed by all the flat plate-shaped filtration membranes 22. With this arrangement, the separation membranes inside the membrane module 23 can be washed efficiently.

Referring to FIG. 7, in the membrane filtration operation, an on-off valve 11 is opened so that air, supplied from a blower 7, is allowed to flow into a main gas-supply pipe 27, and finally, the air is supplied to the fine bubble diffusing tubes 6 through the branch pipes 9 and the gas supply pipes 10. The air is discharged from the fine gas diffusing holes in the surfaces of the fine bubble diffusing tubes 6 so that fine bubbles are produced in the treatment tank (aeration tank)$_g$. An upward-moving stream of a gas-liquid mixture generated by the air lift effect of the discharged fine bubbles and the fine bubbles act as cleaning flows on the surfaces of the separation membranes, so that a cake layer, which tends to adhere to the membrane faces to be deposited thereon upon membrane filtration, can be suppressed.

The blower 7 has the function of supplying gas to the main gas-supply pipe 10 and the fine bubble diffusing tubes 6 downstream thereof, and may typically include a compressor, a fan, a cylinder, or the like. The on-off valve (valve) 8 may be of an opening/closing type or a switching type, as long as it can control the gas flow in the main gas supply pipe 27 when it is turned on or off.

As the length of the fine bubble diffusing tube 6 becomes longer, it tends to fail to diffuse a uniform amount of bubbles in the longitudinal direction a. When the membrane module 23 is a large-scale device having a large number of flat plate-shaped filtration membranes 22, in particular, when the width in the direction α of FIG. 7 is 1200 mm or more, it becomes difficult for the conventional diffusing tube structure as shown in FIG. 18 to diffuse a uniform amount of bubbles in the longitudinal direction. However, in the present invention, even when disposed vertically below the large-size membrane module 23, the fine structure bubble diffusing tube 6 can be installed so as to evenly generate fine bubbles uniformly.

In this case, the gas supply pipes 10 are joined to each other by a branch from the main gas supply pipe 27 extending from the blower 7. With this arrangement, the gas supply pressures are made uniform inside a single fine bubble diffusing tube so that fine bubbles can be easily generated uniformly in an even manner.

Moreover, the fine bubble diffusing tube 6 may have a structure in which, as shown in FIG. 3(a), by attaching a tightening metal member 3 to the center portion in the longitudinal direction so that the length a in the longitudinal direction of the space between the supporting tube 1 and the elastic sheet 2 is divided into two portions. In this case, the positions of the tightening metal members 3, used for dividing the distance into two portions, are preferably arranged so as not to be aligned along a lateral straight line perpendicular to the supporting tube longitudinal direction, that is, so as to allow the positions of the metal members 3 to deviate from one another. If the positions of the tightening metal members 3 are aligned along a straight line, a stream of bubbles becomes smaller above a portion where no bubbles are generated on a peripheral portion X (see FIG. 3) of each tightening metal member 3, with the result that bubbles are not properly made in contact with the membrane surfaces of the flat plate-shaped filtration membranes 22 to cause insufficient film face cleaning. As a result, a fouling cake tends to be formed in a gap between the flat plate-shaped filtration membranes 22 to cause a state in which the membrane filtration process is no longer carried out.

Moreover, in the fine bubble diffusing device that uses a fine bubble diffusing tube having a structure in which, as shown in FIG. 3(a), the length a in the longitudinal direction of the space between supporting tube 1 and the elastic sheet 2 is divided into two portions, a plurality of fine bubble diffusing tubes are disposed virtually in parallel with one another, with the gas supply units being connected to the gas supply pipes, the gas supply units, located on one end side of the fine bubble diffusing tube, are all connected to one gas supply pipe, with a plurality of the gas supply units, located on the other side thereof, being all connected to another gas supply pipe, and with respect to the two gas supply pipes, a plurality of the fine bubble diffusing pipes connected to the gas supply pipe have space portions closest to the gas supply unit having lengths in the longitudinal direction whose differences in the total sum are set within 10%, more preferably, within ±5%. The value representing the difference from the total sum is a value calculated by using the smaller value of the total sums as the denominator. When the difference of the total sums exceeds 10%, the amount of air generated from the diffusing tubes tends to become uneven.

With respect to the gas supply to a plurality of gas supply pipes, the gas supply may be carried out in a manner so as to be branched from the same gas supply device (a blower or the like), or the gas supply pipes are allowed to communicate with different gas supply devices, and gas supplies may be carried out by respectively different gas supply devices. In the former arrangement, the amount of bubble generation from the side closer to one of the gas supply units tends to be greater; however, in the latter arrangement, the amounts of gas supplies to the gas supply pipes can be optimized so that the unevenness of the amount of gas from the respective diffusing tubes due to unbalance in the pressure loss can be desirably suppressed. Moreover, even in the former arrangement, by installing a flow-rate adjusting means on the downstream side of the branch, it is possible to suppress unbalance in the pressure loss.

Moreover, the gas supply pipes are preferably arranged at intervals of 80 to 200 mm in a direction perpendicular to the longitudinal axis direction. If they are arranged closer to one another at smaller intervals, the stream generated between the fine bubble diffusing tubes is reduced so that sludge may be more likely to be deposited on the upper portions of the fine bubble diffusing tubes.

The flow rate of the gas diffused from the fine bubble diffusing tubes is preferably adjusted to 0.9 m$^3$/m$^2$/minute or more in the flow rate of the aeration per horizontal cross-sectional area of the membrane module. If the flow rate is less than that, the diffusion flow rate may become uneven.

Figure 9:
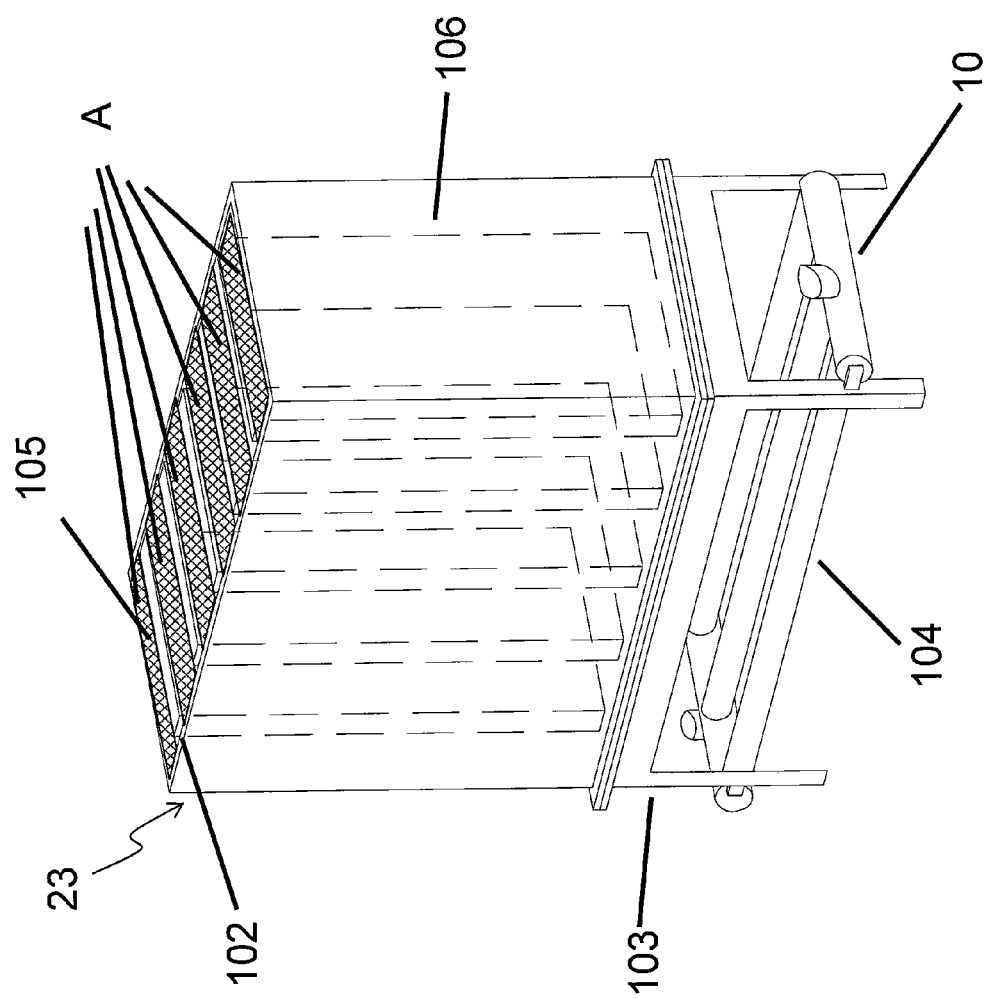
FIG. 9 is a schematic perspective view that shows a submerged membrane separation apparatus in an Example.
Figure 10:
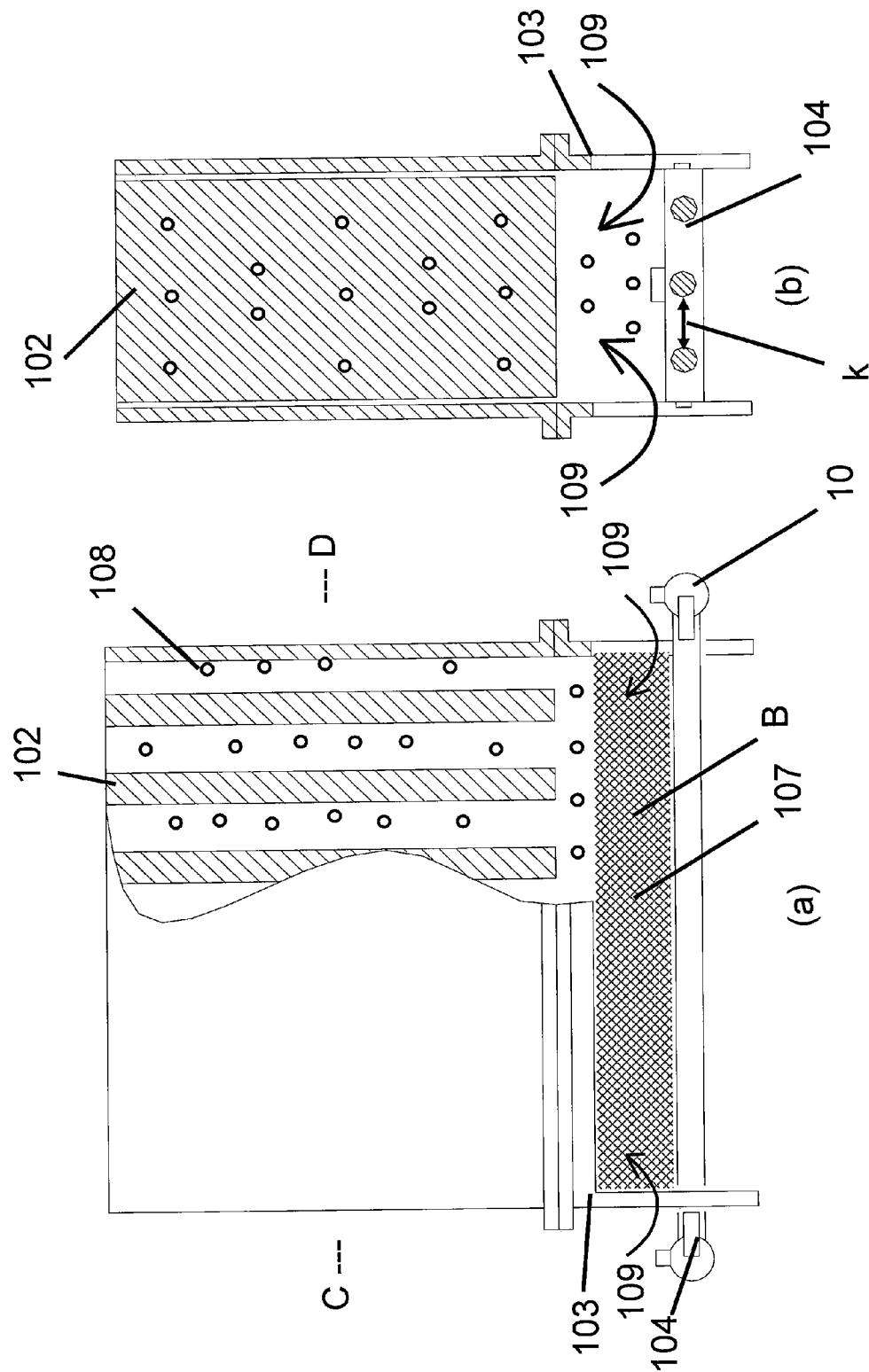
FIG. 10(a) is a schematic diagram (partially broken cross-sectional view) of the membrane separation apparatus of FIG. 9 viewed from a side parallel to the direction of the arrangement of the membrane elements 2.
FIG. 10(b) is a schematic cross-sectional view of the membrane separation apparatus of FIG. 9 viewed along a face perpendicular to the direction of the arrangement of the membrane elements 2.

Moreover, the submerged membrane separation apparatus of the invention may have a structure as shown in FIGS. 9 and 10, which is basically composed a membrane module 23 having a plurality of membrane elements 102 arranged in parallel with one another in the horizontal direction, a diffusing device 104 placed below the membrane module 23, and a frame 103 surrounding the diffusing device and its peripheral space. The membrane elements 102 thus arranged are housed in the casing 106; however, the casing 106 may be omitted by allowing the lateral end portions of the film elements to be tightly made in contact with each other. In this case, the apparatus structure is preferably designed such that the ratio (B/A) is from 0.8 to 5.0, wherein B is the area of the openings of sides of the space surrounded by the frame 103, the sides being parallel to the direction of the arrangement of the membrane elements 102 and located above the diffusing device 104, and A is the area of the openings of the upper portions of the arranged membrane elements.

The term "the direction of the arrangement" refers to the direction in which the membrane elements 102 are arranged, which corresponds to a C-D direction in FIG. 10. Moreover, the area B of the openings above the diffusing device 104 corresponds to the sum of the areas of the portions indicated by reference numeral 107 in FIG. 10($a$). Since the portions indicated by reference numeral 107 in FIG. 10($a$) include front and back side portions, the opening area B is twice the area of the portion directly indicated by reference numeral 107.

The area A of the openings of the upper portions of the membrane elements is the sum (total area) of the areas (upper face areas) of the spaces 105 between the membrane elements in FIG. 9.

In this case, it is preferred that the upper space placed above the diffusing device in the space surrounded by the frame be made wider than that of the conventional apparatus and that the area ratio (B/A) be set from 0.8 to 5.0. In particular, the range is more preferably set to 0.8 to 3.0. By installing the diffusing device 104 in such a position, streams of turning flows 109 are efficiently formed and a large path can be ensured for the turning flows 109 so that a sufficiently high speed stream of the gas-liquid mixture can be supplied to the membrane surface of each membrane element 102 (FIG. 10$b$).

The diffusing device 104 placed and fixed in the space surrounded by the frame 103 is a fine bubble diffusing device provided with fine bubble diffusing tubes, and the aforementioned fine bubble diffusing tubes and diffusing device according to embodiments of the present invention are used. When the pressure loss of the diffusing device 104 is too high, the power consumption increases to cause degradation of energy-saving property and economical efficiency; therefore, the pressure loss is preferably set in a low level.

In an embodiment of the present invention, the separation membrane provided in the separation membrane element of the submerged membrane separation apparatus is a flat membrane, which can function to trap substances with particles sizes of a certain value or more contained in the liquid to be treated, when a pressure is applied to the liquid to be treated or when the filtrate side is under suction, and flat membranes are classified into dynamic filtration membranes, microfiltration membranes and ultrafiltration membranes according to the size of particles to be trapped, and among these, microfiltration membranes are preferably used.

From the viewpoint of high permeability and operation stability, the membranes to be used preferably have high water permeability. The pure water permeability coefficient of the separation membrane before use may be used as an index of the permeability. The pure water permeability coefficient of a porous membrane may be a value that is calculated by measuring the amount of permeated water, using purified water at 25° C. with a head height of 1 m produced by reverse osmosis membrane treatment, and the pure water permeability coefficient is preferably set to $2 \times 10^{-9}$ m$^3$/m$^2$/s/pa or more, more preferably, to $40 \times 10^{-9}$ m$^3$/m$^2$/s/pa or more. In this range, a practically sufficient amount of permeated water can be obtained.

Figure 15:
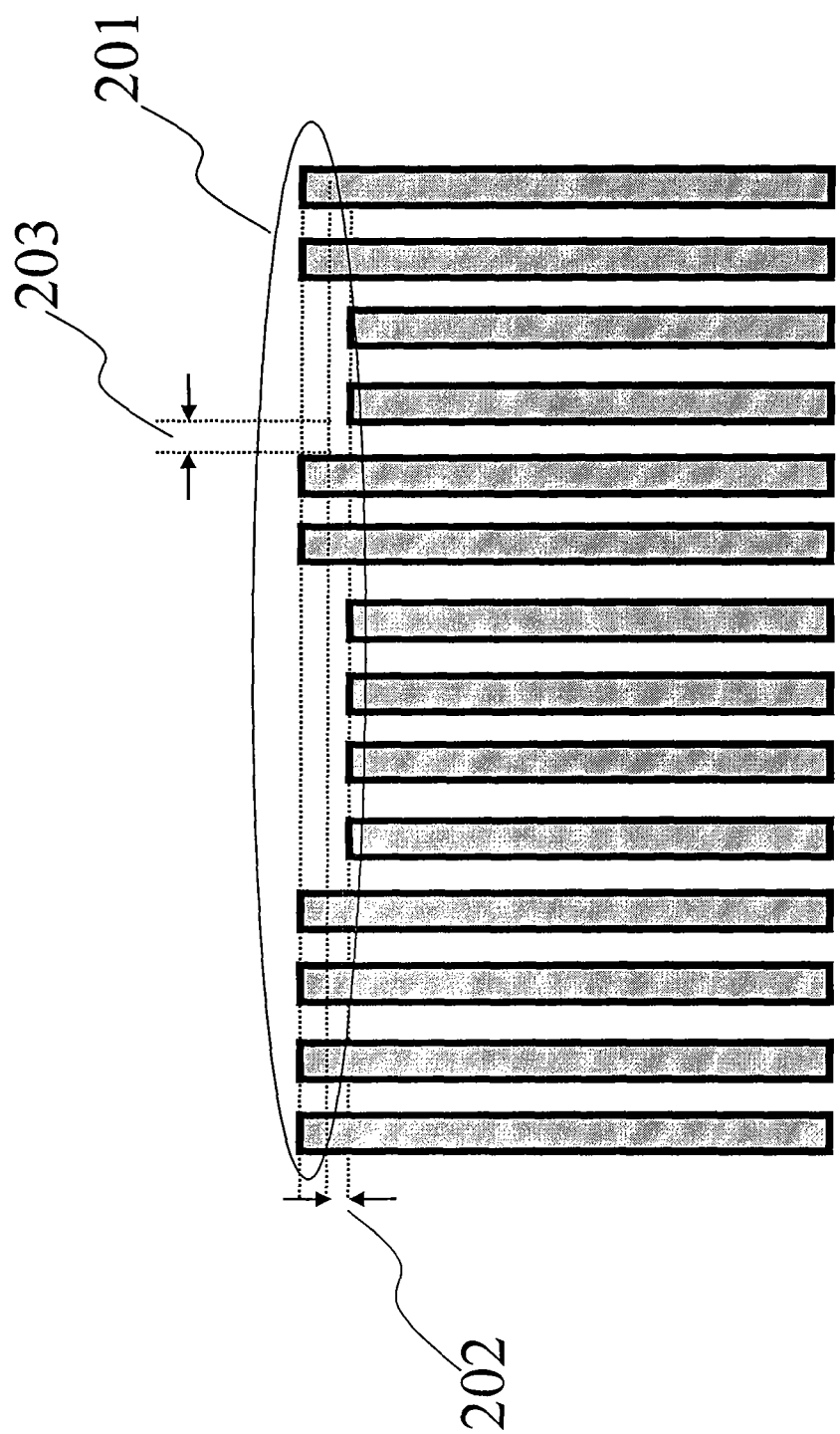
FIG. 15 is a membrane cross-sectional view that schematically shows the surface portion of a separation membrane.

FIG. 15 schematically shows the surface portions of flat membranes used as the separation membranes. In a membrane separation activated sludge process, activated sludge is subjected to solid-liquid separation at membrane surface layer portions 201, and separated water is permeated through the membrane to form filtrated water (treated water). In the apparatus of the invention, the separation membrane to be used preferably has a smooth surface with small surface roughness, such as a surface roughness of 0.1 μm or less, more preferably, 0.001 to 0.08 μm, particularly preferably, 0.01 to 0.07 μm, on the membrane surface. In addition, the separation membrane preferably has an average surface pore size of 0.2 μm or less, more preferably, 0.01 to 0.15 μm, particularly preferably, 0.01 to 0.1 μm, on the membrane surface. When such a separation membrane is used, the membrane surface cleaning effect can be sufficiently obtained even with fine bubbles, which have been considered to have a low cleaning effect, so that a stable operation can be achieved under normal flux conditions, which are required in the membrane separation activated sludge process.

The membrane surface roughness may be the average height in the vertical direction of the surface profile of the separation membrane to be brought into contact with the liquid to be treated, and in the schematic diagram of FIG. 15, it may be represented by the height indicated by reference numeral 202. The membrane surface roughness may be measured by using, for example, an atomic force microscope (Nanoscope IIIa manufactured by Digital Instruments), and the height (represented by Zi) along the Z-axis (perpendicular to the membrane surface) at each point on the membrane surface is measured so that a root-mean-square (RMS) roughness (μm) is calculated according to the following formula 1 as the surface roughness of the membrane surface layer portion.

$$\text{RMS} = \sqrt{\frac{\sum_{i}^{N}(Zi - \bar{Z})^2}{N}} \quad \text{formula 1}$$

The average pore size of the membrane surface is the average value of pore sizes of the separation membrane surface, and in the schematic diagram of FIG. 15, it may correspond to the width represented by reference numeral 203. For example, the average pore size of the membrane surface may be determined by a method including the steps of photographing the membrane surface with a scanning electron microscope at a magnification of 10,000×, measuring the diameters of any ten or more, preferably 20 or more pores, and number-averaging the diameters. When the pores are not circular, circles (equivalent circles) each having the same area as that of each pore may be determined by using an image-processing apparatus or the like, and the diameters of the equivalent circles may be determined as the diameters of the pores. If the standard deviation σ of the pore size is too large, the ratio of the pores with low filtration performance becomes relatively high. Therefore, the standard deviation a is preferably 0.1 μm or less.

When flat separation membranes with such a surface profile are used as separation membranes in the membrane separation apparatus, the membrane surfaces can be well cleaned by the action of fine bubbles on the membrane surface. The reason may be considered as follows.

Figure 16:
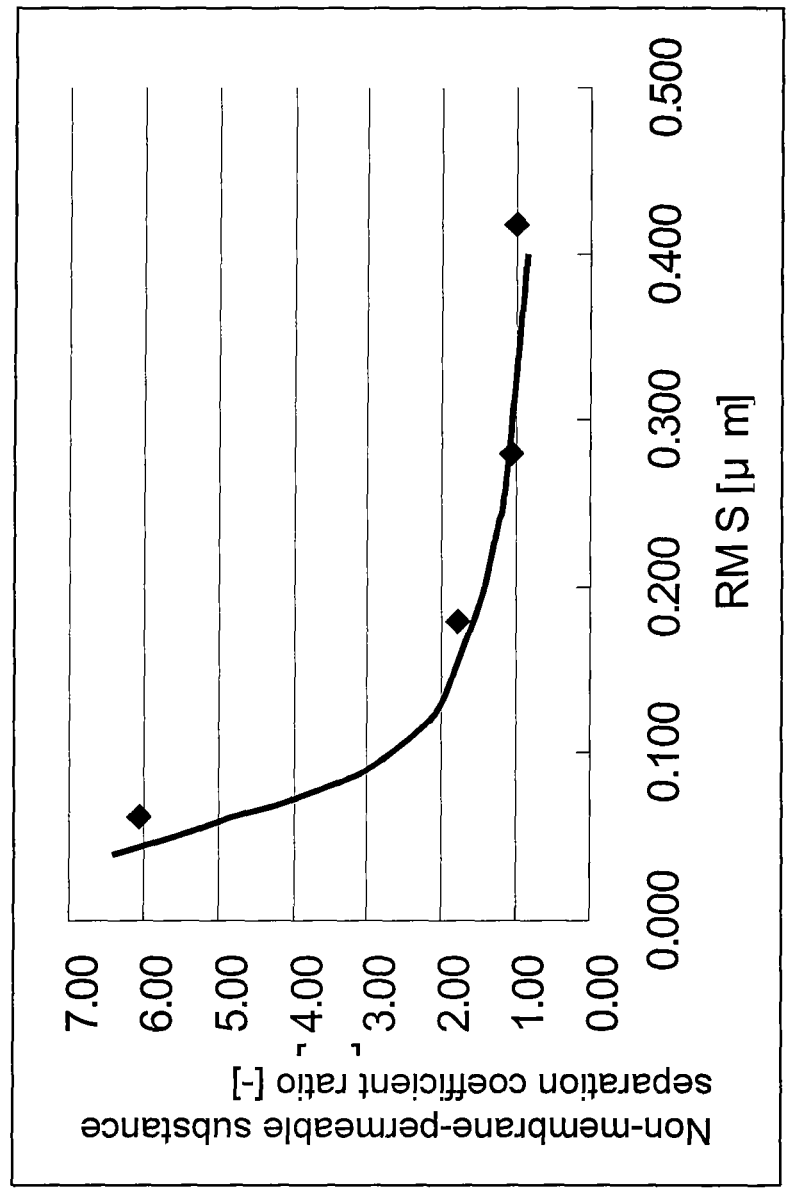
FIG. 16 is a graph that shows the relationship between the surface roughness of a separation membrane (RMS) and the non-membrane-permeable substance separation coefficient ratio.

The non-membrane-permeable substance separation coefficient ratio on the membrane surface tends to increase as the surface roughness of the separation membrane decreases (see FIG. 16). The non-membrane-permeable substance separation coefficient of the membrane surface is a coefficient indicating the degree of easiness of separation of non-membrane-permeable substances from the separation membrane after deposition of the non-membrane-permeable substances from the liquid to be treated onto the separation membrane surface, and the non-membrane-permeable substance separation coefficient ratio is the ratio of the separation coefficient of the sample membrane to the separation coefficient of a standard membrane. Therefore, a higher separation coefficient ratio means that the non-membrane-permeable substances deposited on the separation membrane are more easily separated from the separation membrane so that a non-membrane-permeable substance cake layer is less likely to be formed on the membrane surface, which means higher membrane filtration performance. In this regard, Durapore Membrane Filter VVLP02500 (made of hydrophilic PVDF, 0.10 μm in pore size) manufactured by Millipore is used as the standard membrane.

Figure 17:
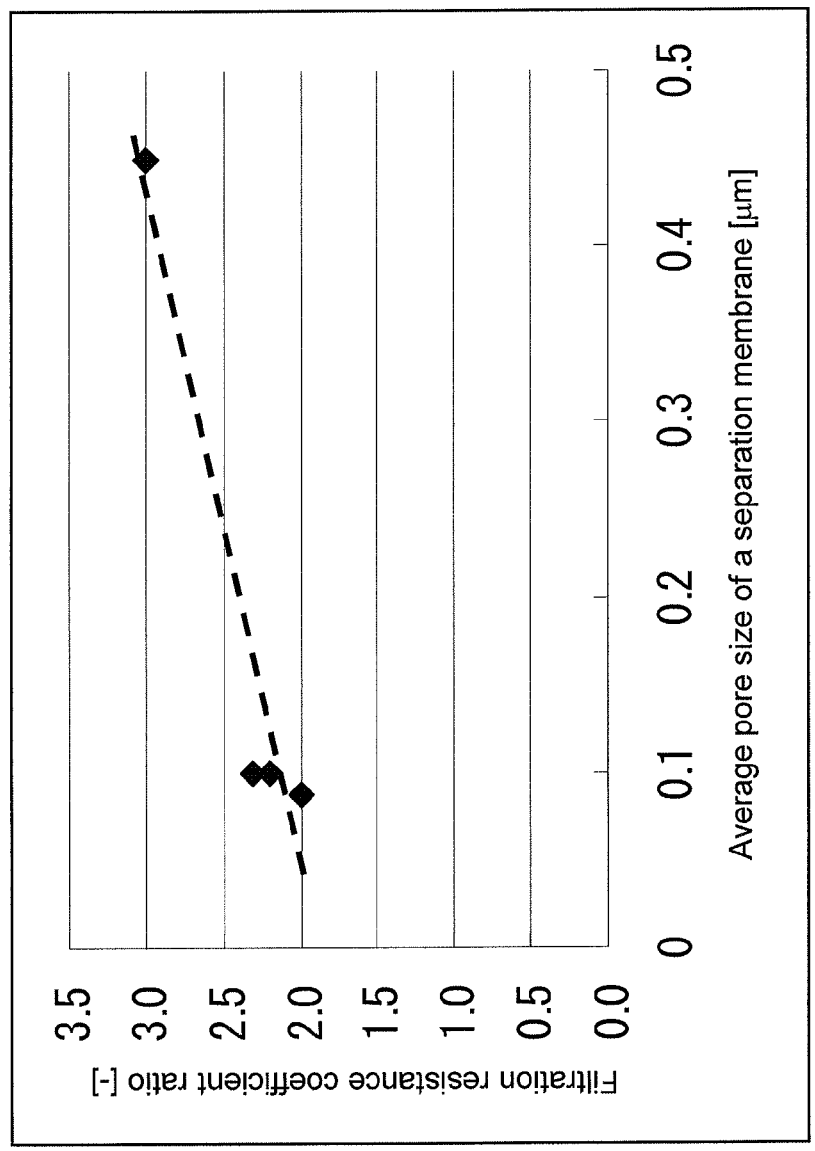
FIG. 17 is a graph that shows the relationship between the average pore size of a separation membrane and the filtration resistance coefficient ratio.

Moreover, the filtration resistance coefficient ratio tends to decrease as the average pore size of the separation membrane decreases (see FIG. 17). The filtration resistance coefficient ratio is the ratio of the filtration resistance coefficient of the separation membrane to that of a standard membrane, wherein the filtration resistance coefficient indicates the amount of resistance generated per unit amount of the non-membrane-permeable substance deposited on the membrane surface. Therefore, a lower filtration resistance coefficient ratio means that the deposition of the non-membrane-permeable substance on the separation membrane surface is less likely to cause membrane filtration resistance, which means higher water permeability.

When fine bubbles rather than coarse bubble are generated from the gas diffusing device and used to act on the membrane surface, the membrane surface cleaning stress excited by the upward-moving stream of the gas-liquid mixture is relatively low. When a separation membrane with a surface roughness of 0.1 μm or less is used, however, the non-membrane-permeable substance deposited on the separation membrane surface can be easily separated therefrom, because of its high non-membrane-permeable substance separation coefficient ratio, and a non-membrane-permeable substance cake layer is less likely to be formed on the membrane surface, so that sufficient membrane filtration performance can be obtained even when fine bubbles are used to clean the membrane surface.

The flat separation membrane with the smooth surface profile specified by the invention may be produced by a manufacturing method described below.

For example, onto a base material of a nonwoven fabric, a membrane-forming material liquid containing a polyvinylidene fluoride resin, a pore-forming agent, and so on is applied, and by immediately solidifying the material liquid in a solidifying liquid containing a non-solvent so that a porous separation-functional layer is formed; thus, a separation membrane to be used in the invention can be produced.

In this case, instead of applying the membrane-forming material liquid to the surface of the base material, the base material may be immersed in the membrane-forming material liquid so that the porous separation-functional layer is formed. In the case of applying the film-forming material liquid to the base material, it may be applied to one of the surfaces of the base material, or may be applied to both of the surfaces. Alternatively, after forming only the porous separation-functional layer separately from the base material, this may be laminated on the base material.

Besides the polyvinylidene fluoride resin, the membrane-forming material liquid may also contain a pore-forming agent, a solvent to dissolve them, and so on, as needed.

When a pore-forming agent having the effect of accelerating pore formation is added to the membrane-forming material liquid, the pore-forming agent to be used should be extractable with the solidifying liquid and have high solubility in the solidifying liquid. Examples of the pore-forming agent that may be used include polyoxyalkylenes such as polyethylene glycol and polypropylene glycol, water-soluble polymers such as polyvinyl alcohol, polyvinyl butyral, and polyacrylic acid, and glycerin.

As the pore-forming agent, a surfactant including a polyoxyalkylene structure, a fatty acid ester structure or a hydroxyl group may be used, and in particular, a surfactant containing two or more of these is preferably used. By using such a surfactant, the target pore structure can be obtained more easily.

The membrane-forming material liquid may also contain a solvent to dissolve the polyvinylidene fluoride resin, any other organic resin, and a pore-forming agent or the like. In such a case, examples of solvents that are preferably used include N-methylpyrrolidone (NMP), N,N-dimethylacetamide (DMAc), N,N-dimethylformamide (DMF), dimethyl sulfoxide (DMSO), acetone, and methyl ethyl ketone. In particular, NMP, DMAc, DMF, and DMSO are preferably used, because the polyvinylidene fluoride resin is highly soluble in them.

In addition, a non-solvent may also be added to the membrane-forming material liquid. The non-solvent does not dissolve the polyvinylidene fluoride resin or any other organic resin and acts to control the rate of the solidification of the polyvinylidene fluoride resin and any other organic resin so that the pore size can be controlled. Water, an alcohol such as methanol or ethanol, or the like may be used as the non-solvent. In particular, water or methanol is preferred in view of easiness of effluent treatment and cost. A mixture of these may also be used.

For the composition of the membrane-forming material liquid, the contents of the polyvinylidene fluoride resin, the pore-forming agent, the solvent, and the non-solvent are preferably in the ranges of 5 to 30% by weight, 0.1 to 15% by weight, 45 to 94.8% by weight, and 0.1 to 10% by weight, respectively.

The non-solvent-containing solidifying bath to be used may be a liquid of the non-solvent or a mixed solution containing the non-solvent and a solvent.

On the other hand, when the membrane-forming material liquid does not contain any non-solvent, the content of the non-solvent in the solidifying bath is preferably lower than that in the case that the membrane-forming material liquid contains the non-solvent. For example, it is preferably from 60 to 99% by weight.

As described above, the content of the non-solvent in the solidifying bath may be controlled so that the surface roughness, pore size or macrovoid size of the surface of the porous layer can be controlled. If the temperature of the solidifying bath is too high, the solidification rate may be too high; in contrast, if it is too low, the solidification rate may be too low. Normally, it is preferably selected in the range of 15° C. to 80° C. More preferably, it is in the range of 20° C. to 60° C.

The production method described above allows the production of a separation membrane including a porous base material and a porous polyvinylidene fluoride resin layer formed on the surface of the porous base material, wherein the porous resin layer includes: a separation-functional layer having a smooth surface (with a surface roughness of 0.1 μm or less) and a desired average pore size (0.01 to 0.2 μm) necessary for membrane filtration formed in the outer surface side of the porous resin layer; and a macrovoid-containing layer formed inner than the separation-functional layer. Therefore, the porous resin layer includes: the macrovoid-containing layer existing in an inside portion close to porous base material; and the separation-functional layer having the desired pore size and the smooth surface and existing in an outer surface portion.

By using the above-mentioned submerged membrane separation apparatus, it is possible to achieve a stable membrane separation. Additionally, upon driving the present submerged membrane separation apparatus, the separation membrane may be washed by using a chemical. As the method to be used at this time, for example, a method is proposed in which, when the membrane filtration pressure becomes a predetermined value or more, an alkali aqueous solution or an acid aqueous solution is injected from the permeate side of the separation membrane element, and this is set aside for a predetermined period of time. At this time, as the alkali aqueous solution, a hypochlorite aqueous solution is preferably used, and as the acid aqueous solution, an oxalic acid aqueous solution and a citric acid aqueous solution are preferably used.

EXAMPLES

Example 1

Figure 11:
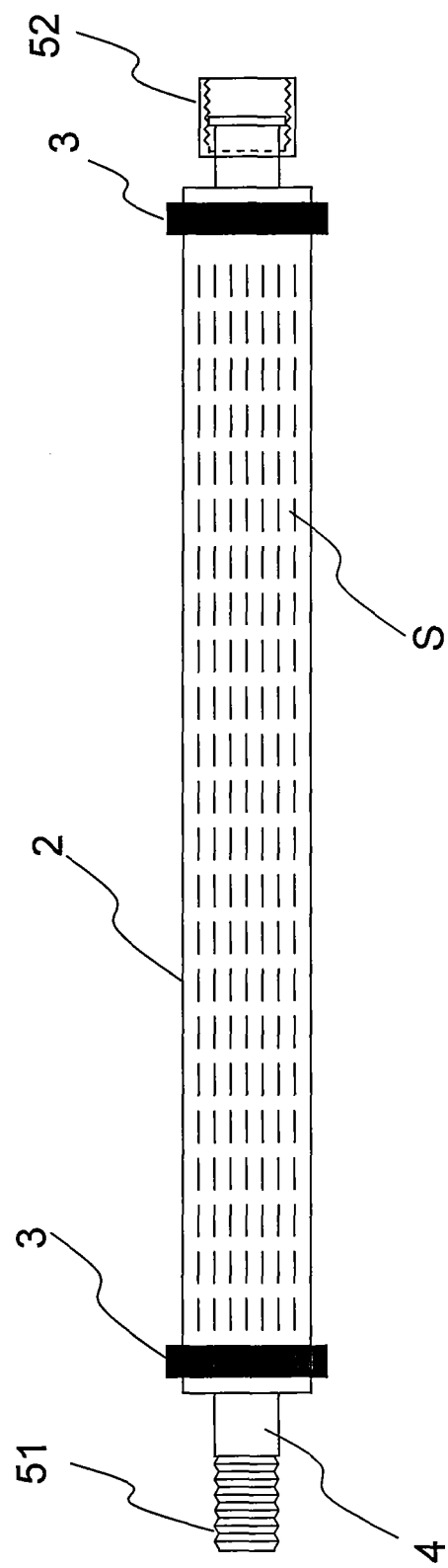
FIG. 11 is a schematic outside drawing that shows a fine bubble diffusing tube in an Example.

A fine bubble diffusing tube having a structure as shown in FIG. 1 and FIG. 11 was produced.

A supporting tube (length: 1600 mm, ϕ62 mm) having a cylindrical shape, made from a carbon-fiber reinforced resin, was used as its supporting tube 1, and pipes made of stainless steel were attached to the two ends of the supporting tube 1 as gas supply units 4, and a through hole 5 penetrating the outer circumferential portion of the supporting tube 1 and the inside of the gas supply unit 4 was formed. One end of each of the gas supply units 4 placed on the two ends was formed as an external thread opening 51 on its tip portion, and the other end was provided with a union 52 on its tip portion. An elastic sheet 2 made from EPDM rubber was placed in a manner so as to cover the outer circumference of the supporting tube 1, with its two ends being tightened onto the supporting tube 1 with tightening metal members 3. The distance between the tightening metal members 3 attached to the two end portions was set to 1400 mm. Fine slits S with a width of 2 mm were formed on the elastic sheet 2 with an interval of 2 mm, as shown in FIG. 11. Three diffusing tubes having this structure were prepared.

Next, as the gas supply pipe used for connecting the gas supply unit of the fine bubble diffusing tube, two pipe-shaped gas supply pipes 10L and 10R, made of stainless steel, as shown in FIG. 12, were produced. The two ends of the pipe tips of each of the gas supply pipes were closed, and gas supply inlets 53 were branched from the upper portion thereof, and three branch pipes 9L and 9R were respectively attached thereto. In this case, in FIG. 12, the tip end of each branch pipe 9L on the left was formed as an internal thread opening, and the tip end of each branch pipe 9R on the right was formed as an external thread opening.

First, each of the external thread openings 51 of the three fine bubble diffusing tubes 6 was connected to each branch pipe 9L of the gas supply pipe 10L on the left. Next, the tip end of each branch pipe 9R of the gas supply pipe 10R on the right and the tip end of the gas supply pipe unit 4 of the fine bubble diffusing tube 6 were made in contact with each other with an O-ring made from EPDM interposed therebetween, and these were connected to each other by using a union 52. In this manner, a fine bubble diffusing device, shown in FIG. 13, was produced.

Figure 13:
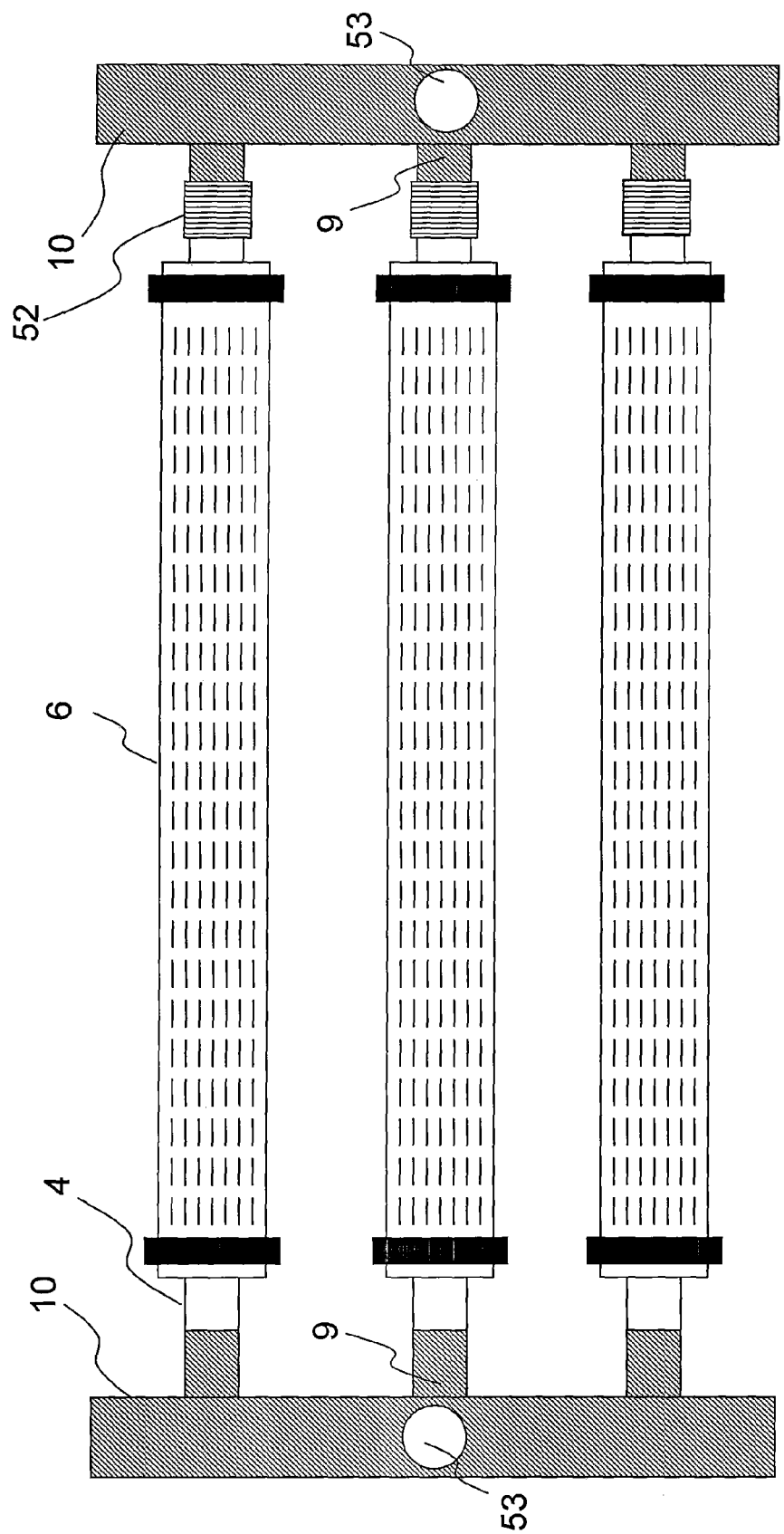
FIG. 13 is a schematic outside drawing that shows fine bubble diffusing tubes in an Example.

In the fine bubble diffusing device shown in FIG. 13, the gas was supplied from the gas supply inlets 53, and allowed to flow through the inside of each gas supply pipe 10, the inside of each branch pipe 9, the inside of each gas supply unit 4 and the through hole 5, and was also allowed to flow into the space between the elastic sheet 2 and the supporting tube 1; thus, the elastic was expanded so that the fine slits S were opened to generate fine bubbles.

On the other hand, separation membranes (flat membranes) were placed on the front and back sides of a supporting ABS plate (1,000 mm high×500 mm wide×6 mm thick) having irregularities on both sides, which were used as an alternative to a channel member, so that a membrane element (separation membrane area: 0.9 m$^2$) was prepared. The separation membranes used were flat polyvinylidene fluoride membranes with an average surface pore size of 0.08 μm and a surface roughness (RMS) of 0.062 μm.

The flat membrane was prepared by using the following method. Polyvinylidene fluoride (PVDF) resin, polyethylene glycol (PEG) having a molecular weight of about 20,000, used as a pore-opening agent, N,N-dimethylacetamide (DMAc) serving as a solvent, and pure water serving as a non-solvent, were used, and sufficiently stirred at a temperature of 90° C. so that a film-forming material solution having the following composition was prepared.

| | |
|---|---|
| PVDF: | 13.0 weight % |
| PEG: | 5.5 weight % |
| DMAc: | 78.0 weight % |
| Pure water: | 3.5 weight % |

Next, after having been cooled to 25° C., the resulting membrane-forming material liquid was applied onto a nonwoven fabric (base material) made from polyester fibers having a density of 0.48 g/cm$^3$ and a thickness of 220 μm, and immediately after the coating process, this was immersed into pure water of 25° C. for five minutes, and further immersed into hot water of 80° C. three times to wash DMAc and PEG away so that a separation membrane was produced.

Next, a casing was formed, which had upper and lower openings and an interior size (approximate dimension) of 1,000 mm high×515 mm wide×1,400 mm long. A frame was joined to the lower end of the casing. The fine bubble diffusing device was fixed at the predetermined position in the interior of the frame, and the vertical distance between the lower end of the element and the fine bubble diffusing device was 220 mm. In this structure, the area of the opening of one side being parallel to the direction of the arrangement of the membrane elements and located above the diffusing device was 2,520 cm². When 100 membrane elements were loaded into the casing, the area of the openings of the upper sides of the membrane elements was 4,000 cm² on the upper side of the casing. Therefore, the ratio B/A was 2,520×2/4,000=1.26. In this case, the horizontal distance between the diffusing tubes was set to 125 mm.

As described above, a submerged membrane separation apparatus having a structure, as shown in FIGS. 9 and 10, was produced in which 100 membrane elements 102 were loaded into the casing 106, with the frame 103 and the diffusing tubes 104 being installed therein.

Figure 14:
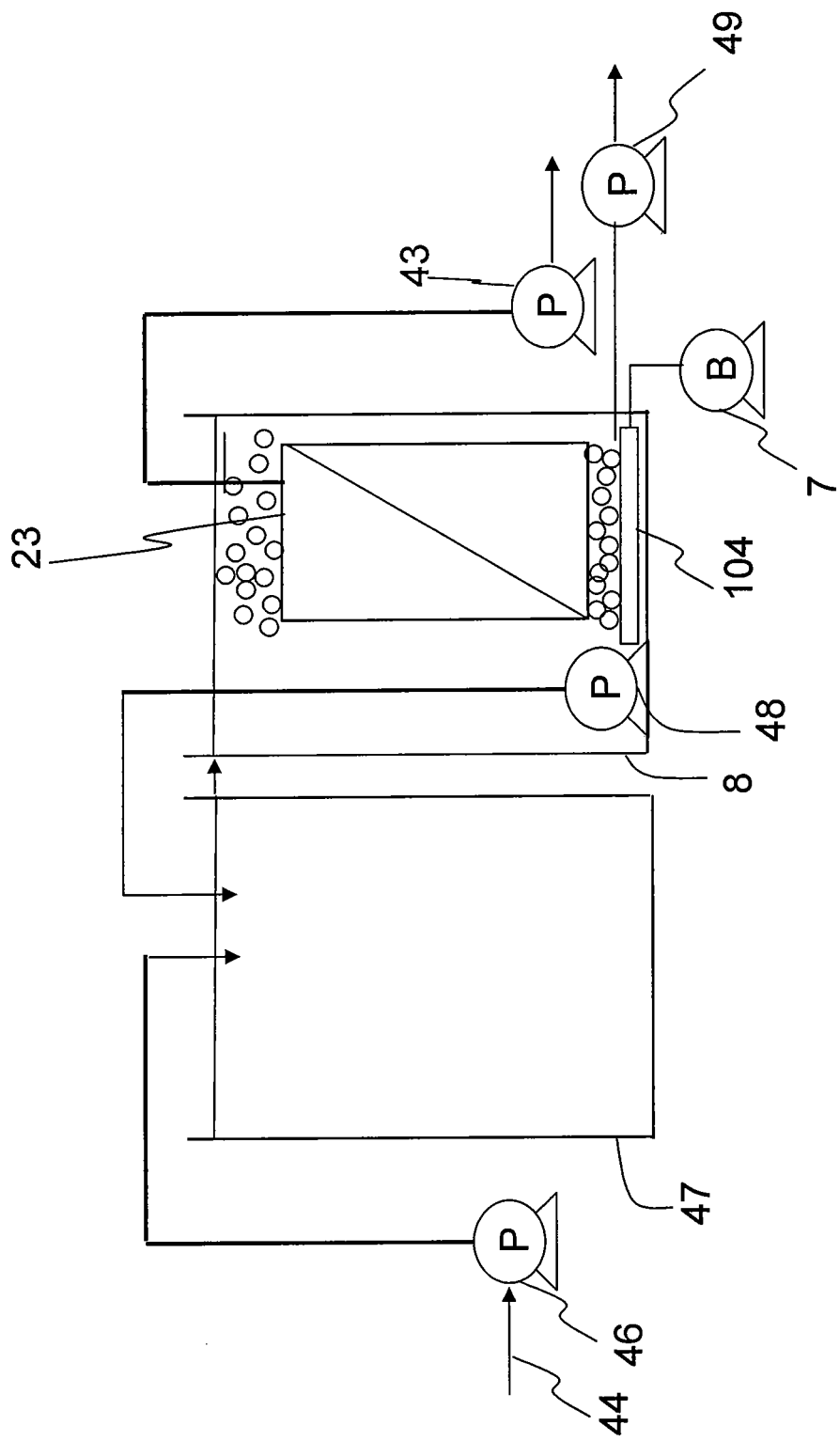
FIG. 14 is a schematic diagram showing a waste water treatment apparatus for a membrane separation activated sludge process adopted in the Examples.

Domestic waste water was treated under conditions summarized in Table 1 according to the water purification process for the treatment apparatus shown in FIG. 14. In FIG. 14, the submerged membrane separation apparatus was shown as the membrane elements-containing membrane module 23 and the diffusing device 104 in a simplified manner. As shown in FIG. 14, raw water (domestic wastewater) 44 is first introduced into a denitrification tank 47 through a raw water supply pump 46 and mixed with activated sludge. The activated sludge mixture liquid is then introduced into a treatment tank 8. In the biological treatment process, a nitrification process (aerobic) and a denitrification process (anaerobic) are allowed to proceed so that nitrogen can be removed. Ammonia nitrogen ($NH_4$—N) is nitrated in the later treatment tank 8 (aeration tank), and the nitrated liquid is fed back to the earlier denitrification tank 47 by a sludge circulation pump 48, so that nitrogen is removed in the dinitrification tank 47.

In treatment tank 8, air is blown from a blower 7 and discharged for aeration through the diffusing device 104. The activated sludge is kept in an aerobic state by the aeration so that nitrification reaction and BOD oxidation are carried out. In addition, the aeration makes it possible to clean the sludge, which may adhere or be deposited onto the membrane surfaces in the separation membrane module 23. The sludge is periodically drawn by a sludge drawing pump 49 so that the MLSS concentration in the treatment tank 8 and the aeration tank 47 can be maintained.

The membrane filtration with the separation membrane module 23 was performed, while the permeate side was sucked by a suction pump 43. A timer was installed to prevent the deposition of the sludge on the separation membrane surfaces, and according to the pre-recorded program, a relay switch was used to periodically switch ON/OFF of the suction pump so that the membrane filtration was performed in an intermittent operation mode including cycles of ON for 8 minutes and OFF for 2 minutes. During the operation, the membrane filtration flux is fixed at 1.0 m/day (average flux). Table 1

TABLE 1

| | Specifications |
|---|---|
| Type of raw water | Domestic wastewater |
| Quality of raw water (average) | BOD (biological oxygen demand): 200 mg/L TN (total nitrogen): 45 mg/L TP (total phosphorous): 8 mg/L |
| Water throughput | 24 m³/day |
| Volume of biological treatment tank | Denitrification tank: 5 m³ Membrane separation activated sludge tank: 5 m³ Total 10 m³ |
| Hydraulic retention time (HRT) | 10 hours(denitrification tank: 5 hours, membrane separation activated sludge tank: 5 hours) |
| Activated sludge conditions | Membrane separation activated sludge tank MLSS: 8,000 mg/L-15,00 0 mg/L Membrane separation activated sludge tank dissolved oxygen (DO): 0.5-2.0 mg/L |
| Amount of sludge circulation | Three times the amount of the liquid to be treated: 72 m³/day |
| Temperature of liquid to be treated | 13° C.-28° C. |
| Aeration amount | 10 L/min · EL × 100EL = 1000 L/min |

The membrane differential pressure was measured with time as an index of the operational performance, and the time course was used. If the turning flow is unevenly generated during the operation, the membrane differential pressure will increase to make a stable operation difficult; therefore, variations in the membrane differential pressure may be used to evaluate the operational performance.

The operation was performed for 90 days. As a result, the rate of rise of the differential pressure was hardly observed over 90 days, and it was possible to continue an almost stable operation.

Example 2

In the same structure of the submerged membrane separation apparatus as that in Example 1, the position of the diffusing device fixed to the frame was changed, so that the fine bubble diffusing tubes were placed in such positions that the vertical distance between the lower end of the membrane element and the diffusing device was 120 mm, 155 mm or 460 mm. In such a structure, the B/A ratio was 0.56, 0.805 or 2.94, to which 2(*a*), 2(*b*) or 2(*c*) was assigned.

These membrane separation apparatuses were each used under the same operation conditions as those in Example 1. As a result, when the vertical distance between the lower end of the element and the diffusing device was 120 mm (the case 2(*a*)), the differential pressure rapidly increased in about 30 days, and by carrying out a chemical washing process in which an aqueous solution of 0.5% sodium hypochlorite was injected to the separation membrane from the permeate side, and this was set aside for two hours, the operation could be carried out; in contrast, in the case when the vertical distance between the lower end of the element and the diffusing device was 155 mm (the case 2(*b*)) or 460 mm (the case 2(*c*)), it was possible to continue an almost stable operation without the necessity of washing the separation membrane with a chemical.

The fine bubble diffusing tube and the fine bubble diffusing device according to embodiments of the invention are desirably used as a fine bubble means to be installed in a submerged membrane separation apparatus. Moreover, this submerged membrane separation apparatus is suitable for use in an activated sludge process tank in treatment of polluted water such as sewage, excrement, or industrial wastewater. The submerged membrane separation apparatus of the invention may also be used to perform membrane separation of various types of water other than polluted water (such as tap water).

The invention claimed is:

1. A fine bubble diffusing device comprising: at least fine bubble diffusing tubes and gas supply pipes,
   wherein each one of the fine bubble diffusing tubes comprises: at least a cylindrical supporting tube, and an elastic sheet with fine slits formed therein, with the elastic sheet being placed so as to cover the outer circumference of the supporting tube, so that, upon supplying a gas to a space between the elastic sheet and the supporting tube, the fine slits of the elastic sheet are opened to generate fine bubbles outside the diffusing tube,
   wherein the supporting tube has a length of 1000 mm or more in the longitudinal direction, with gas supply units serving as flow inlets of the gas, and one of the gas supply units being attached to each of the two ends of the supporting tube, and
   the space between the elastic sheet and the supporting tube is divided into at least two portions in the longitudinal direction by a space dividing means, with the length of each of the divided spaces in the longitudinal direction being set to 1000 mm or less, and
   a plurality of the fine bubble diffusing tubes are disposed virtually in parallel with one another, with the gas supply units attached to the fine bubble diffusing tubes being connected to the gas supply pipes,
   wherein a plurality of the gas supply units, located on one end side of each of the fine bubble diffusing tubes, are all connected to one of the gas supply pipes, and a plurality of the gas supply units, located on the other end side of the fine bubbles diffusing tubes, are all connected to another one of the gas supply pipes.

2. The fine bubble diffusing device according to claim 1, wherein, with respect to at least one end side, a connecting portion between the gas supply unit of the fine bubble diffusing tube and the gas supply pipe has a connecting structure capable of being detachably attached by inserting a member of the connecting portion between the gas supply unit and the gas supply pipe, without both the gas supply unit and the gas supply pipe being rotated.

3. The fine bubble diffusing device according to claim 2, wherein the connecting portion having the connecting structure capable of being detachably attached by inserting the member of the connecting portion between the gas supply unit of the fine bubble diffusing tube and the gas supply pipe is provided with an O-ring placed on the connecting portion as a sealing member.

4. The fine bubble diffusing device according to claim 1, wherein, with respect to at least one end side, a connecting portion between the gas supply unit of the fine bubble diffusing tube and the gas supply pipe has a connecting structure in which connecting ends are joined to one another without rotating a member of the connecting portion, and connect the gas supply unit of the fine bubble diffusing tube to the gas supply pipe by using a connecting member capable of being detachably attached.

5. The fine bubble diffusing device according to claim 4, wherein the connecting member capable of being detachably attached, is at least one member selected from the group consisting of a flange, a union and a clamp.

6. A submerged membrane separation apparatus, which is submerged and placed in a treatment tank in which a treated liquid is stored, comprising: a separation membrane module in which a plurality of separation membrane elements, each having a flat film disposed as a separation membrane, are arranged side by side, with membrane faces being set in parallel with each other, and a fine bubble diffusing device installed vertically below the submerged membrane separation device,
   wherein the fine bubble diffusing device is a fine bubble diffusing device disclosed in claim 1.

7. The submerged membrane separation apparatus according to claim 6, wherein the gas supply pipes, each of which is connected to one side of the fine bubble diffusing tubes, are joined to each other by a branch from a main gas supply pipe extending from an aeration device.

8. The submerged membrane separation apparatus according to claim 6, wherein a distance between the lower end of the separation membrane elements and the highest level of the fine bubble diffusing tubes is set to 300 mm or less.

9. The fine bubble diffusing device according to claim 1, wherein the total sum of the lengths in the longitudinal direction of the plurality of fine bubble diffusing tubes connected to one of the gas supply pipes, as measured from one end side of each fine bubble diffusing tube to the space dividing means is within 10% of the total sum of the lengths of the plurality of fine bubble diffusing tubes connected to the other gas supply pipe, as measured from one end side of each fine bubble diffusing tube to the space dividing means.

10. The fine bubble diffusing device according to claim 1, wherein the positions of the space dividing means, used for dividing the space between the elastic sheet and the supporting tube into at least two portions in the longitudinal direction, are arranged so as to deviate from one another in a perpendicular direction to the supporting tube longitudinal direction.

* * * * *